(12) United States Patent
Paul et al.

(10) Patent No.: US 6,466,972 B1
(45) Date of Patent: Oct. 15, 2002

(54) SERVER BASED CONFIGURATION OF NETWORK COMPUTERS VIA MACHINE CLASSES

(75) Inventors: Chakkalamattam Jos Paul; Steven Michael French, both of Austin; Aidon Paul Jennery, Round Rock; Glenn Edwards Brew, Austin; James Richard Schoech, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,632

(22) Filed: Mar. 31, 1999

(51) Int. Cl.[7] .............................................. G06F 17/30
(52) U.S. Cl. ....................... 709/222; 709/219; 709/221
(58) Field of Search ........................ 707/102; 709/217, 709/220, 221, 222; 713/1, 2

(56) References Cited

U.S. PATENT DOCUMENTS

| | | | |
|---|---|---|---|
| 5,361,358 A | | 11/1994 | Cox et al. ..................... 717/174 |
| 5,452,454 A | | 9/1995 | Basu .............................. 713/2 |
| 5,555,416 A | | 9/1996 | Owens et al. .................. 717/178 |
| 5,577,210 A | | 11/1996 | Abdous et al. ............. 709/219 |
| 5,619,716 A | | 4/1997 | Nonaka et al. ............. 717/167 |
| 5,684,952 A | | 11/1997 | Stein ........................... 709/221 |
| 5,870,554 A | * | 2/1999 | Grossman et al. ............. 713/2 |
| 5,974,547 A | * | 10/1999 | Klimenko ...................... 713/2 |
| 6,101,601 A | * | 8/2000 | Matthews et al. ............. 713/2 |
| 6,199,108 B1 | * | 3/2001 | Casey et al. ................. 709/220 |
| 6,201,996 B1 | * | 3/2001 | Crater et al. .................... 700/9 |
| 6,209,089 B1 | * | 3/2001 | Selitrennikoff et al. ........ 713/2 |
| 6,256,635 B1 | * | 7/2001 | Arrouye et al. ............. 707/102 |
| 6,260,076 B1 | * | 7/2001 | Savitzky et al. ............. 709/315 |
| 6,308,205 B1 | * | 10/2001 | Carcernano et al. ........ 709/221 |
| 6,314,455 B1 | * | 11/2001 | Cromer et al. .............. 709/217 |
| 6,317,826 B1 | * | 11/2001 | McCall et al. .................. 713/1 |
| 6,366,898 B2 | * | 4/2002 | Taivalsaari et al. ............ 707/1 |

FOREIGN PATENT DOCUMENTS

| | | | |
|---|---|---|---|
| EP | 0791881 A1 | 8/1997 | ........... G06F/9/445 |
| JP | 06332716 | 12/1994 | ............. G06F/9/06 |

OTHER PUBLICATIONS

International Business Machines; Portable Boot; Mar. 1995; IBM Technical Disclosure Bulletin vol. 38, No. 03.; p. 235.

* cited by examiner

Primary Examiner—N. Le
Assistant Examiner—Walter Benson
(74) Attorney, Agent, or Firm—Duke W. Yee; Jeffrey S. LaBaw; Stephen R. Tkacs

(57) ABSTRACT

The present invention provides a system for creating server-managed configuration information for computing devices. The configuration information is composed of individual configuration components. The configuration components can be grouped for convenience into templates called machine classes, which can be used to manage a set of similar machines. Configuration components and machine classes can be stored permanently in a database. Machine classes are instantiated with machine-specific information such as network addresses and configuration information for peripherals to produce fully configured operating systems for a computing device. Software and configuration information is installed based on the machine class selected. Individual configuration components can be added or overridden when the machine instance is created. The machine instance can be customized with additional configuration information, such as its network address(es), machine name, and video resolution. The machine instance can be used either to boot a device remotely or to install the operating system locally on the computing device.

29 Claims, 17 Drawing Sheets

| | |
|---|---|
| BUS_TYPE | Value is ISA, VLB, MCA or PCI |
| DISKETTE_SUPPORT | Value is YES or NO |
| HARDFILE_TYPE | Value is IDE or SCSI |
| KEYBOARD_MODE | Value is " " |
| KEYBOARD_TYPE | Value is 101 or appropriate |
| MOUSE_TYPE | Value is PS/2 MOUSE or SERIAL MOUSE |
| NAME | Value is CPQ5120E which will appear in the OS/2 WarpServer Administration GUI when you create a new WorkSpaceOn-Demand client |
| PARALLEL_SUPPORT | Value is YES or NO |
| REMARK | Value is "CPQ5120E, ISA, Cirrus Logic 5434" which is just a description field |
| SERIAL_SUPPORT | Value is YES or NO |
| VIDEO_MONITOR | Value is "PARAMETER_NOT_SUPPORTED" |
| VIDEO_RESOLUTION | Value is "PARAMETER_NOT_SUPPORTED" |
| VIDEO_TYPE | Value is "Cirrus Logic 5434" |

*FIG. 17*

Directory of C:\OS2\MDOS\WINOS2\SYSTEM

```
8-06-96    12:26p    116416    0  16ms640.drv
7-16-96     3:43p    133312    0  16m_640.drv
7-16-96     4:22p    121616    0  256s1280.drv
7-16-96     3:43p    151424    0  256_1280.drv
7-16-96     4:22p    120592    0  64ks1024.drv
7-16-96     3:43p    154000    0  64k_1024.drv
3-08-96     9:08p     10976    0  8514FIX.FON
3-08-96     9:08p     12272    0  8514OEM.FON
3-08-96     9:08p      9264    0  8514SYS.FON
9-05-97     1:24p     25948    0  CONTROL.INF
3-08-96     9:08p     31712    0  COURF.FON
3-06-96     7:40p      3452    0  MIDIMAP.BAK
3-08-96     9:08p     81728    0  SERIFF.FON
3-08-96     9:09p     21504    0  SMALLF.FON
3-08-96     9:08p     89680    0  SSERIFF.FON
3-06-96     6:39p     81504    0  SYMBOLF.FON
16 file(s)         1196471  bytes used
```

Remarks: These are SVGA Driver and Font files and they are common to all machines. Therefore, these files don't need to be copied into PRIVATE directories.

*FIG. 18d*

The volume label in drive C is OS2.|
The Volume Serial Number is 6725:6415.

Directory of C:\

9-05-97  1:24p   3541    0 CONFIG.SYS
9-05-97  1:31p   312     0 WP ROOT. SF
4 file(s)   5992 bytes used Remark: While we don't care about WP ROOT. SF., We examine CONFIG.SYS in detail and document the changes that are made to this file.
Directory of C:\DMISL\BIN 9-05-97  1:29p   74752   0 sldb.dmi
1 file(s)   74752 bytes used Remark: This is Systems Management Information that is not needed to build a Machine Class.
Directory of C:\IBMCOM 9-05-97  1:30p   699     0 LANTRAN.LOG
1 file(s)   699 bytes used Remark: The LANTRAN.LOG file gets recreated every time LAN services is started. Therefore the archive bit is set. This file is not needed to create a Machine Class.
Directory of C:\IBMLAN\LOGS 9-05-97  1:31p   48      0 NET.AUD
1 file(s)   48 bytes used Remark: The NET.AUD file gets recreated every time LAN services is started. Therefore the archive bit is set. This file is not needed to create a Machine Class.
Directory of C:\OS2

9-05-97  1:24p   60481   0 INI.RC
9-05-97  2:00p   201884  0 OS2.INI
9-05-97  1:28p   69525   0 OS2SYS.INI
9-05-97  1:24p   22778   0 PMCONTRL.INF
9-05-97  1:26p   1140    0 private.dif
8-12-96  1:25a   10962   0 screen01.sys
8-12-96  1:25    11436   0 screen02.sys
9-05-97  1:24p   43238   0 svgadata.pmi
9-05-97  1:24p   23      0 SVGATMP.BAT
9-05-97  1:28p   2764    0 video.cfg
9-05-97  1:26p   35      0 video.err
13 file(s)   424266 bytes used Remarks: This directory contains several files that are needed to create a Machine Class. They are the OS2.INI, OS2SYS.INI, PRIVATE.DIF, SVGADATA.PMI and VIDEO.CFG. files. These files are copied into the CPQ5120E.MC subdirectory as outlined in Figure 57 in topic 8.3.1.5.

*FIG. 18a*

Directory of C:\OS2\BOOT

| | | | | |
|---|---|---|---|---|
| 9-05-97 | 1:30p | 2655 | 0 | PREVIOUS |
| 1 file(s) | | 2655 bytes used | | |

Remarks: This file is dependent on the detection level of the Hardware Manager Setting. This file gets recreated at every new boot time when the setting is not disable in the Hardware manager. This file is not needed to create a Machine Class.

Directory of C:\OS2\DLL

| | | | | |
|---|---|---|---|---|
| 8-12-96 | 2:02a | 32750 | 49 | BVHSVGA.DLL |
| 8-12-96 | 2:07a | 42387 | 49 | bvhvga.dll |
| 8-06-96 | 12:26p | 416668 | 0 | cirrus.dll |
| 8-12-96 | 5:40a | 44196 | 0 | display.dll |
| 9-05-97 | 1:31p | 146 | 0 | dock0.cfg |
| 9-05-97 | 1:31p | 46 | 0 | dock1.cfg |
| 9-05-97 | 1:31p | 46 | 0 | dock10.cfg |
| 9-05-97 | 1:31p | 46 | 0 | dock11.cfg |
| 9-05-97 | 1:31p | 46 | 0 | dock12.cfg |
| 9-05-97 | 1:31p | 46 | 0 | dock13.cfg |
| 9-05-97 | 1:31p | 46 | 0 | dock14.cfg |
| 9-05-97 | 1:31p | 46 | 0 | dock15.cfg |
| 9-05-97 | 1:31p | 46 | 0 | dock2.cfg |
| 9-05-97 | 1:31p | 46 | 0 | dock3.cfg |
| 9-05-97 | 1:31p | 46 | 0 | dock4.cfg |
| 9-05-97 | 1:31p | 46 | 0 | dock5.cfg |
| 9-05-97 | 1:31p | 46 | 0 | dock6.cfg |
| 9-05-97 | 1:31p | 46 | 0 | dock7.cfg |
| 9-05-97 | 1:31p | 46 | 0 | dock8.cfg |
| 9-05-97 | 1:31p | 46 | 0 | dock9.cfg |
| 8-09-96 | 4:20a | 249590 | 333 | dspres.dll |
| 8-09-96 | 3:07a | 82891 | 333 | ibmdev32.dll |
| 9-05-97 | 1:31p | 753 | 0 | SCENTER.CFG |
| 8-12-96 | 2:03a | 60455 | 49 | videopmi.dll |
| 24 file(s) | | 930526 bytes used | | |

Remarks: Several files from this directory are needed to create a Machine Class. They are the CIRRUS.DLL, BVHSVGA.DLL, DISPLAY.DLL and the VIDEOPMI.DLL files. Although the other files were touched, during the SVGA installation, examining the PRE and POST SVGA.DAT files shows that these files have the same size and time stamp before and after the video installation. Therefore, only the four files mentioned above are copied into a PRIVATE video subdirectory (see section "Create a Video Subdirectory" in topic 8.3.1.6, for details).

*FIG. 18b*

Directory of C:\OS2\INSTALL

| | | | | |
|---|---|---|---|---|
| 9-05-97 | 1:23p | 34 | 0 | CD.LOG |
| 9-05-97 | 1:24p | 2835 | 0 | DSPINSTL.LOG |
| 9-05-97 | 1:23p | 120 | 0 | install.err |
| 9-05-97 | 1:23p | 228 | 0 | install.hst |
| 9-05-97 | 1:24p | 18312 | 0 | INSTALL.LOG |
| 9-05-97 | 1:23p | 302 | 0 | OS2MM.LOG |
| 9-05-97 | 1:25p | 1206 | 0 | REINSTALL.INI |
| 9-05-97 | 1:24p | 308 | 0 | winfile.ins |
| 9-05-97 | 1:23p | 20 | 0 | WINOS2.LOG |
| 9-05-97 | 1:27p | 41650 | 0 | WPINSTAL.INI |
| 10 file(s) | | 65015 bytes used | | |

Remarks: These files are not needed to create a Machine Class, they are simply additional sources of installation and change information.

Directory of C:\OS2\MDOS

| | | | | |
|---|---|---|---|---|
| 8-29-96 | 10:38p | 147963 | 49 | vsvga.sys |
| 8-29-96 | 10:39p | 65386 | 49 | vvga.sys |
| 2 file(s) | | 213349 bytes used | | |

Remarks: These drivers are standard DOS drivers available in OS/2 Warp Version 4 as well as WorkSpace On-Demand. They are not needed to create a Machine Class.

Directory of C:\OS2\MDOS\WINOS2

| | | | | |
|---|---|---|---|---|
| 9-05-97 | 9:48a | 460 | 0 | ATM.BAK |
| 9-05-97 | 1:23p | 460 | 0 | ATM.INI |
| 5-10-96 | 4:02p | 4076 | 0 | CONTROL.BAK |
| 9-05-97 | 9:48a | 202 | 0 | PROGMAN.BAK |
| 3-06-96 | 8:28p | 44 | 0 | STARTUP.BAK |
| 9-05-97 | 9:53a | 1687 | 0 | SYSTEM.BAK |
| 9-05-97 | 1:30p | 1890 | 0 | system.ini |
| 9-05-97 | 9:53a | 4137 | 0 | WIN.BAK |
| 9-05-97 | 1:30p | 4138 | 0 | win.ini |
| 3-06-96 | 8:22p | 13538 | 0 | WOS2ACCE.BAK |
| 3-06-96 | 8:22p | 5091 | 0 | WOS2MAIN.BAK |
| 11 file(s) | | 35723 bytes used | | |

Remarks: BAK files are automatically created backup files and are not needed to create a Machine Class. Although the ATM.INI file was touched it, wasn't changed. However, we do need to take a closer look at the WIN.INI and SYSTEM.INI files, because they are needed to create a Machine Class.

*FIG. 18c*

; support for the CPQ5120E Machine Class

; video support for the Cirrus Logic 5434 driver

; writeable file

```
Z:\OS2\PRIVATE.*        \\BBSRV01\WRKFILES\DEFAULT\OS2
Z:\OS2\SVGADATA.*       \\BBSRV01\WRKFILES\DEFAULT\OS2
Z:\OS2\VIDEO.*          \\BBSRV01\WRKFILES\DEFAULT\OS2
```

; readonly files

```
Z:\OS2\DLL\BVHSVGA.DLL    BB10.US\OS2\VIDEO\CL5434\BVHSVGA.DLL
Z:\OS2\DLL\CIRRUS.DLL     BB10.US\OS2\VIDEO\CL5434\CL5434.DLL
Z:\OS2\DLL\DISPLAY.DLL    BB10.US\OS2\VIDEO\CL5434\DISPLAY.DLL
Z:\OS2\DLL\VIDEOPMI.DLL   BB10.US\OS2\VIDEO\CL5434\VIDEOPMI.DLL
Z:\OS2\DLL\IBMGPMI.DLL    BB10.US\OS2\VIDEO\CL5434\IBMGPMI.DLL
```

*FIG. 20*

```
[boot]
display.drv=256_1280.drv
sdisplay.drv=256s1280.drv

[boot.description]
display.drv=Cirrus 54xx Accelerated 640x480x256
sdisplay.drv=Cirrus 54xx Accelerated 640x480x256

[256s1280.drv]
fontsize=96
docdepth=6
Enable216=0
WidthxHeight=640x480

[clvga]
videomode=0x5f
logo=0
```

*FIG. 21*

SERVER BASED CONFIGURATION OF NETWORK COMPUTERS VIA MACHINE CLASSES

BACKGROUND OF THE INVENTION

1. Technical Field

The present invention relates generally to an improved process for configuring operating systems for server-managed computer systems. Still more particularly, the present invention relates to a method and apparatus for creating diverse Machine Classes which can be used as templates to create a fully configured, bootable operating system for an instance of a particular computing device.

2. Description of Related Art

In the early 1980s, as the first Personal Computers (PCs) came onto the market, people in the Information Systems (IS) industry thought that PCs might replace mainframe computers and cut operating costs drastically. Over the years, as Personal Computers gained more functionality and better user interfaces, end-users improved their productivity. While enterprise data and legacy applications were still placed on the more reliable mainframe platforms, there was more and more need for distributed access to these resources.

The goal of network computing is to provide functions for accessing legacy data and applications while reducing the overall costs of operating an enterprise-wide environment. This goal can be achieved only by the implementation of standards on all the platforms involved, such as TCP/IP for the networking protocol and 100 percent pure Java applications. This will lead to truly portable applications and solutions where in the network computing environment, all devices are able to communicate with one another easily. The advantage of network computing technologies is that they let you choose from a wider scope of works.

Because different users have varying application needs, different technologies have to be employed to serve those needs. Various network client systems provide a better user fit because of their attributes, such as:

Non-Programmable Terminals (NPTs) are connected to host-based applications systems where the user interface is managed and controlled by the central processing system;

Network Computers (NCs) offer greater versatility than NPTs because of their built-in capabilities, access to Java and Windows-based applications, and a browser;

Managed PCs offer the user the ability to run new network-computing operating systems;

NetPCs and Managed PCs are very similar; however, NetPCs have sealed cases and are not upgradeable, while Managed PCs may have locked covers and can be upgraded; and Traditional PCs such as desktop and laptop PCs are designed to offer highly sophisticated end-user environments. They offer a full-function set of applications and access to data from wherever they are being operated, even when there is no network connection available.

Network computing can be described as the use of different open technologies providing connectivity, ease-of-use, application functionality, information access, scalability and systems management across widely versed types of networks. One of the main intentions of network computing is the any-to-any type of connectivity between applications without having to worry about the hardware or software platforms being used. By making use of open standard technologies, network computing provides many benefits of the client/server paradigm while avoiding its numerous shortcomings. Typically, the network computing approach provides a three-tier solution, although not all are three-tier. This three-tier environment consists of:

Client workstations handle the user interface and a minimal set of application functions.

Web server or Mid level. The major application functions, some of the data processing and updating are performed at this level.

A corporate central processor. Corporate data accessing and legacy processing are performed here.

The client workstations play an important role in a network computing environment because they provide the end user with an overall view of the complete solution.

Remote boot is the process of loading an operating system onto a workstation from a location that is remote to the workstation. The RIPL protocol was co-developed by 3Com, Microsoft and IBM. It is used today with the IBM OS/2 Warp Server, DEC Pathworks, and Windows NT. Two other commonly used remote boot protocols are a Novell RPL (Remote Program Load) and a BOOT-P, an IEEE standard used with UNIX and TCP/IP networks (and DHCP (Dynamic Host Configuration Protocol), a closely related protocol).

Remote boot is achieved using a combination of hardware and software. The requesting device, called the requester or workstation, starts up by asking the loading device to send it a bootstrap program. The loading device is another computer that has a hard disk and is called the remote boot server or boot server. The boot server uses a boot service program to send the bootstrap program to the workstation. Once the workstation receives the bootstrap program, it is then equipped to request an operating system, which in turn can request and use application programs. The software implementations differ between vendors but, theoretically, they all perform similar functions and go through a similar process.

SUMMARY OF THE INVENTION

The present invention provides a system for creating server-managed configuration information for computing devices. The configuration information is composed of individual configuration components. The configuration components can be grouped for convenience into templates called machine classes, which can be used to manage a set of similar machines (e.g., a specific model of a computing device). Configuration components and machine classes can be stored permanently in a database. Machine classes are instantiated with machine-specific information such as network addresses and configuration information for peripherals (e.g., video monitors and printers) to produce fully configured operating systems for a computing device. Software (e.g., device drivers) and configuration information (e.g., registry entries) are installed based on the machine class selected. Individual configuration components (i.e. network adapters, printers) can be added or overridden when the machine instance is created. The machine instance can be customized with additional configuration information, such as its network address(es), machine name and video resolution (pixel depth). The machine instance can be used either to boot a device remotely (e.g., a network computer or diskless machine) or to install the operating system (and related drivers) locally on the computing device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 17 illustrates typical entries that are commonly found in the CPQ5120E.INI file;

FIGS. 18A–18D provide a sample list and comments regarding which files may apply to specific circumstances;

FIG. 20 represents the contents of the CPQ5120E.FIT file; and

FIG. 21 represents a list of changes made to the SYSTEM.INI file by using a comparison tool.

DETAILED DESCRIPTION OF THE PREFERRED EMBODIMENT

Figure 1:
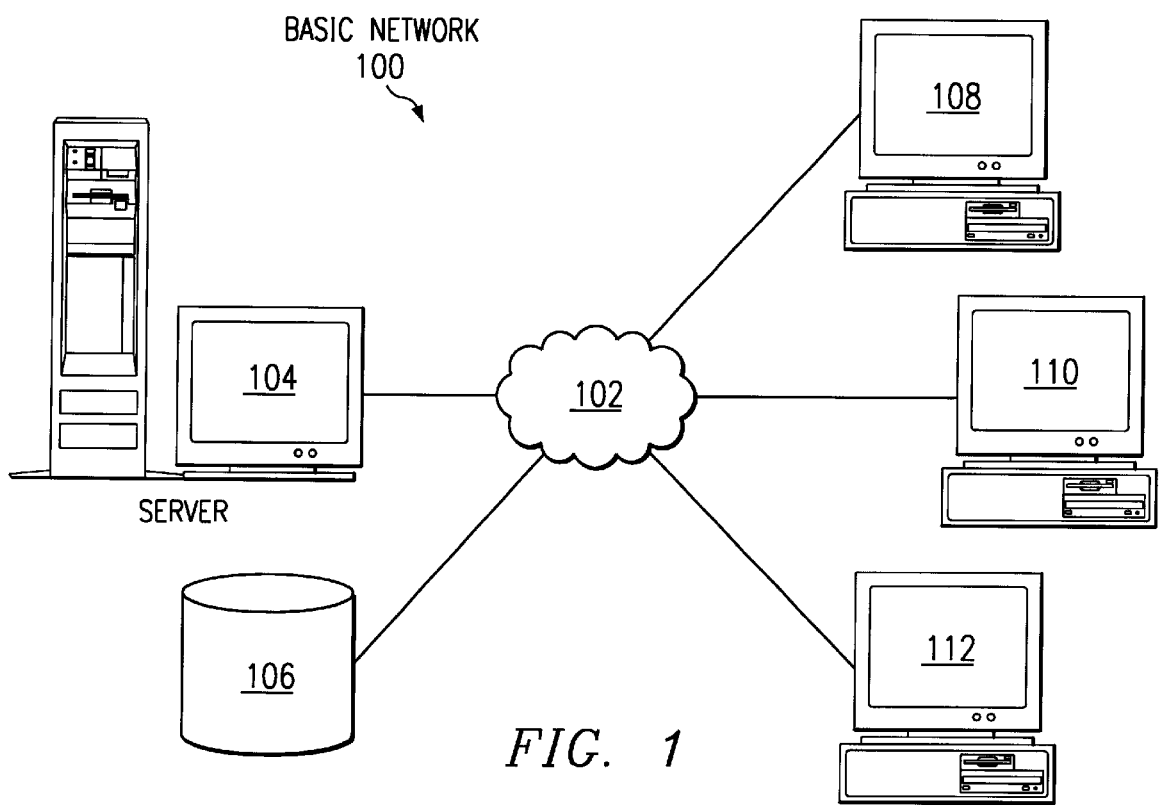
FIG. 1 is an illustration of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 along with storage unit 106. In addition, clients 108, 110 and 112 are also connected to network 102. These clients 108, 110 and 112 may be, for example, personal computers or network computers. For purposes of this application, a network computer is any computer coupled to a network that receives a program or other application from another computer coupled to the network. In the depicted example, server 104 provides data, such as boot files, operating system images, and applications to clients 108–112. Clients 108, 110 and 112 are clients to server 104. Distributed data processing system 100 may include additional servers, clients, and other devices not shown. In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
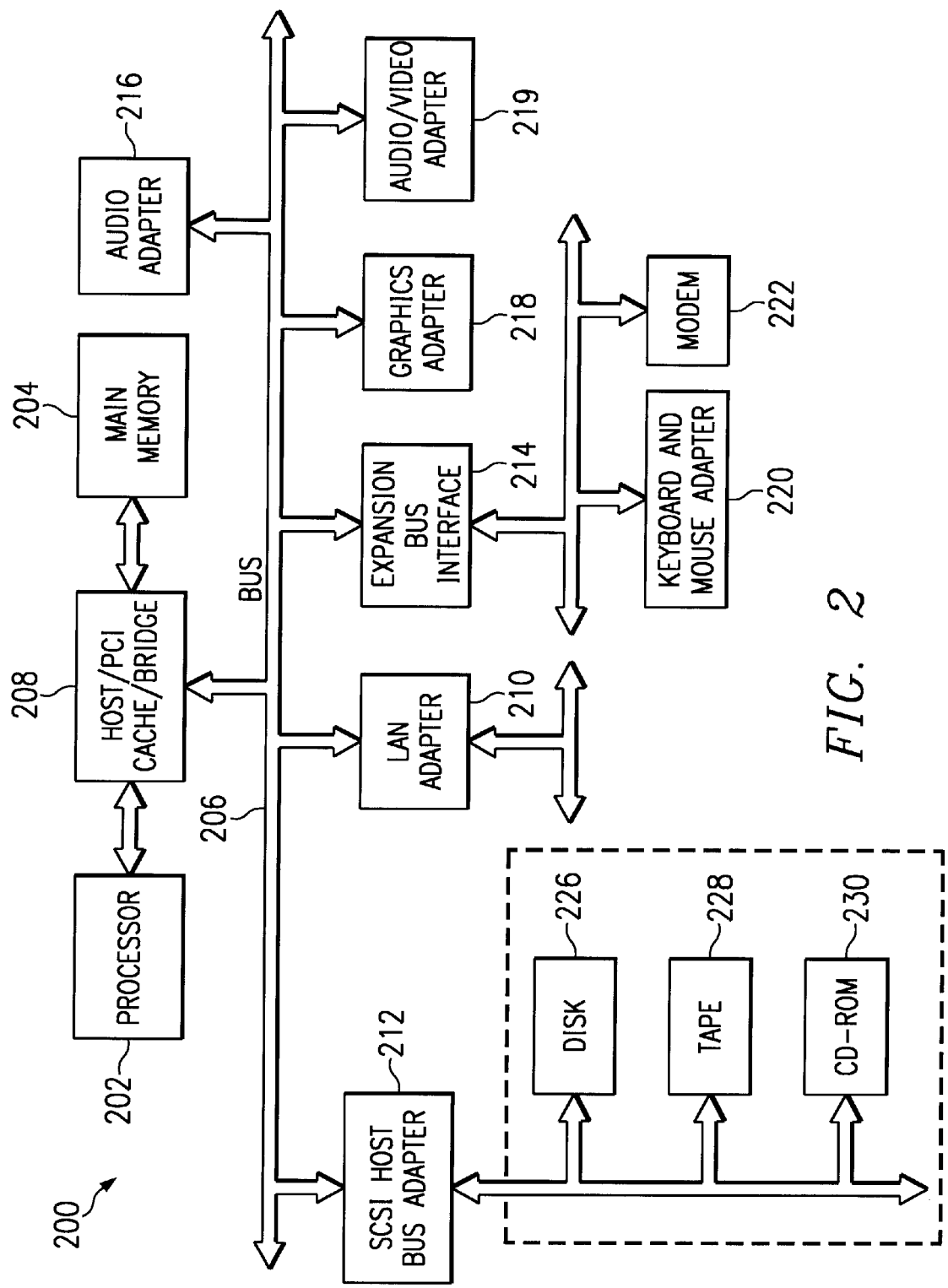
FIG. 2 is a block diagram of a data processing system in which the present invention may be implemented.

With reference now to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI Bridge 208. PCI bridge 208 also may include an integrated memory controller and cache memory for processor 202. Additional connections to PCI local bus 206 may be made through direct component interconnection or through add-in boards. In the depicted example, Local Area Network (LAN) adapter 210, SCSI host bus adapter 212, and expansion bus interface 214 are connected to PCI local bus 206 by direct component connection. In contrast, audio adapter 216, Graphics adapter 218, and audio/video adapter (A/V) 219 are connected to PCI local bus 206 by add-in boards inserted into expansion slots. Expansion bus interface 214 provides a connection for a keyboard and mouse adapter 220 and modem 222. SCSI host bus adapter 212 provides a connection for hard disk drive 226, tape drive 228 and CD-ROM 230 in the depicted example. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as "OS/2", which is available from and a trademark of International Business Machines Corporation. An object oriented programming system such as Java may run in conjunction with the operating system, and provides calls to the operating system from Java programs or applications executing on data processing system 200. Instructions for the operating system, the object-oriented operating system, and applications or programs are normally located on storage devices, such as hard disk drive 226, and may be loaded into main memory 204 for execution by processor 202.

In a preferred embodiment of the present invention, the client computer systems are of the NetPC or Managed PC type and generally lack any onboard storage capabilities. This is signified in FIG. 2 by the dashed line around the SCSI host bus adapter 212 and connections to hard disk drive 226, tape drive 228 and CD-ROM 230.

Lack of any onboard storage requires that the server provide workstation information needed by the remote computer for booting including a record entry that matches the network address contained in the boot request, a set of boot block definition files, a file index table (FIT), and an NDISDD.PRO file (network driver description).

Those of ordinary skill in the art will appreciate that the hardware in FIG. 2 may vary depending on the implementation. For example, other peripheral devices such as optical disk drives and the like may be used in addition to or in place of the hardware depicted in FIG. 2. The depicted example is not meant to imply architectural limitations with respect to the present invention. For example, the processes of the present invention may be applied to the multiprocessor data processing system. It is important to note that, while the present invention has been described in the context of a fully functioning data processing system, those of ordinary skill in the art will appreciate that the processes of the present invention are capable of being distributed in a form of a computer-readable medium of instructions and a variety of forms, and that the present invention applies equally regardless of the particular type of signal bearing media actually used to carry out the distribution. Examples of computer-readable media include recordable-type media such as a floppy disc, a hard disk drive, a RAM, CD-ROMs, and transmission-type media such as digital and analog communications links.

The description of the present invention has been presented for purposes of illustration and description, but is not meant to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

The remotely booted workstation requires a special ROM installed on its LAN adapter or mother board. This ROM is also known as a boot ROM. The boot ROM contains the initial code to begin the process. In order for a network adapter to work with an application-access-operating-environment, such as Workspace On-Demand, the adapter needs to support a remote boot protocol. Examples of remote boot protocol are RIPL, Boot-P, and PXE/DHCP. With an application-access-operating-environment server, a bootable remote boot diskette can also be created for selected network adapters. The boot diskette initializes the adapter and starts the remote boot process. This diskette could be used if the network adapter card does not have a remote boot support. MKRDPM is a presentation manager (PM) based utility supplied with the application-access-operating-environment server, and can be used to create diskettes for PC Network, token-ring, and Ethernet networks.

Figure 3:
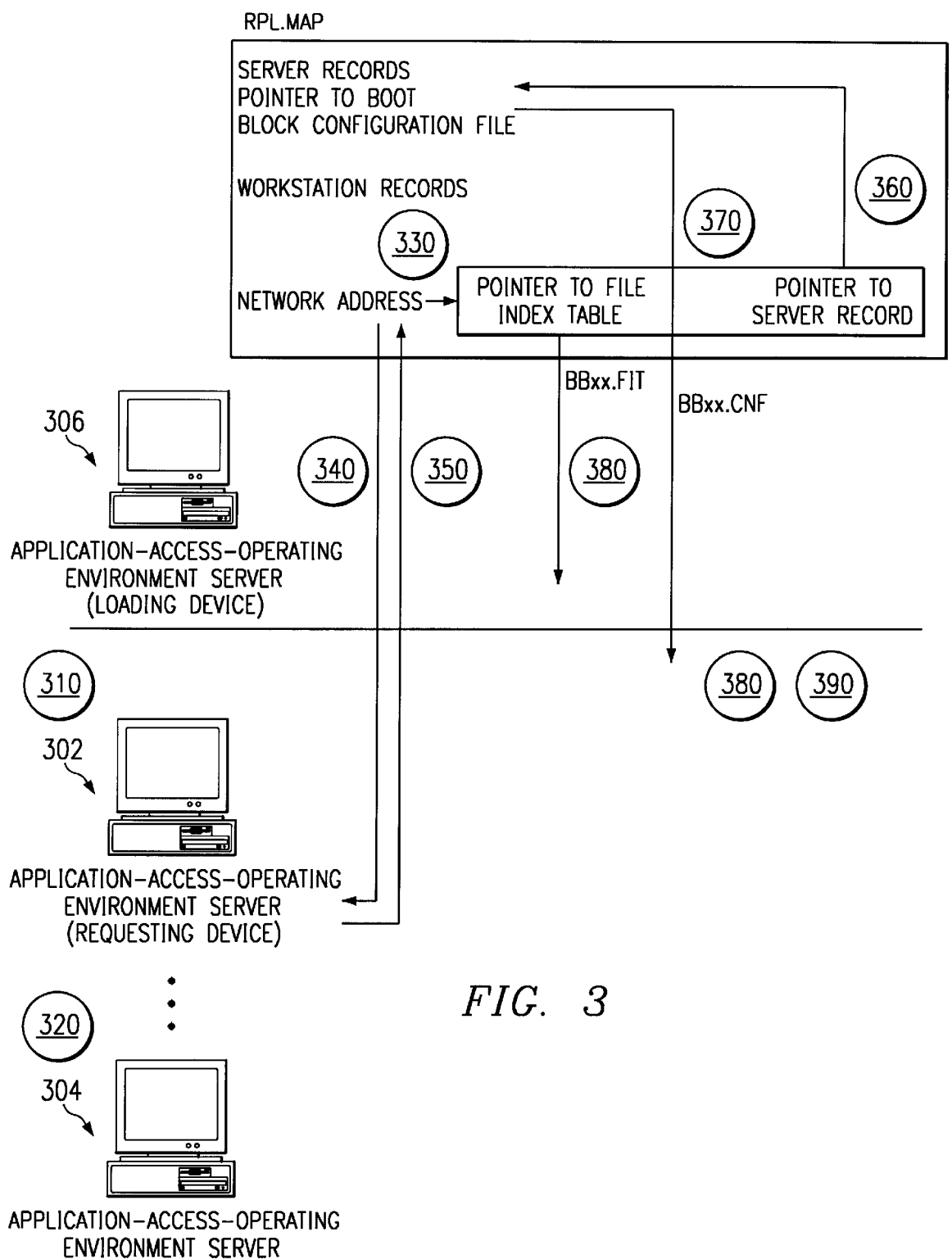
FIG. 3 illustrates the Remote Initial Load Program (RIPL)

FIG. 3 illustrates the Remote Initial Load Program (RIPL) process. While the depicted example uses RIPL protocol, a boot image can be created for remotely booting any computer configuration that utilizes any remote boot protocol. The purposes of the three devices are: Boot Server 306, a loading device such as an application-access-operating-environment server; a Remote Computer Systems (Requesting Device) 302, such as application-access-operating-environment; and other Remote Computer Systems might be configured on the same network as shown by application-access-operating-environment 304.

The server must have a fixed disk. Its purpose is to supply files to the workstations. Also, both the RIPL server and the workstations must support the same network type, for example, token-ring or Ethernet.

Although the workstation does not need a fixed disk or diskette drive, it may have one. It receives all the data it needs from the server.

The following section describes the sequence of events that occur during a remote program loading operation. To keep the scenario simple, only the major steps between the two devices are described. Process steps are depicted in FIG. 3 with circles around the step numbers.

Initially, server (remote boot server) 306 is powered on and attaches to the network ring (step 310). A loading program is started and waits for a FIND frame from the requesting device. The loading program is started by issuing a remote boot command on the application-access-operating-environment server. Next, remote computer system 302 (application-access-operating-environment workstation) is powered on, and the RPL feature (on the network adapter) obtains control (step 320).

The RPL feature attaches the workstation to the network ring and sends a FIND frame. The RIPL ROM code initializes the adapter and starts sending special IEEE 802.2 FIND frames that are recognized by RIPL servers. FIND frames contain the LAN adapter address and are repeated periodically until a server responds. Boot server 306 then receives the FIND frame sent by requesting device 302 (step 330). Boot server 306 then checks the RPL.MAP file for a workstation record entry that matches the network address contained in the FIND frame. The workstation record contains two pointers. The first pointer is to a server record entry contained in the RPL.MAP file, and the second pointer is to the file index table (FIT) file. If an entry exists, boot server 306 responds by sending a FOUND frame (step 340).

Boot server 306 provides its address in this frame so remote computer system 307 can identify it. Next, remote computer system 302 receives the FOUND frame with the address of server 302 and sends a SEND.FILE.REQUEST frame back (step 350). This frame is a request for the server to send the bootstrap program. In the following sequence step, the bootstrap program information is contained in the boot block configuration file (.CNF) on the server (step 360). This file contains the data to be sent in the FILE.DATA.RESPONSE frames used to start the initial boot of the workstation. The CNF file used is derived from the server record entry in the RPL.MAP file.

Server 306 receives the SEND.FILE.REQUEST request frame, and sends the bootstrap program to workstation 302 by transmitting FILE.DATA.RESPONSE frames (step 370). The FILE.DATA.RESPONSE frames contain the boot block information. The boot block contains RIPL control data, the mini-file system driver, the FIT file and the loader.

Requesting device 302 receives the bootstrap program and places it into memory (step 380). In most cases, more than one frame is required to send the complete bootstrap program. After the last frame of the program is received by the requesting device, control is transferred from the RPL feature to the bootstrap program. After the boot block is loaded, control is passed to RPLBOOT.SYS. RPLBOOT.SYS hooks interrupt 21*h* to handle file I/O requests and moves the DOS drivers to high real memory (just below the 640 KB boundary) and initializes them. It then transfers control to the appropriate loader, application-access-operating-environment-LDR, for the application-access-operating-environment. The workstation's FIT file and the mini file system driver are passed to the application-access-operating-environment-LDR. The file index table is used to map the standard file calls to the redirected file location on the server. The operating system kernel and the base device drivers start loading. Up to this point, the DOS drivers and the mini-file system driver are still used for file redirection.

Finally, when the networkstation driver is loaded, file redirection is switched to using the operating system network drivers and LAN server file redirection (step 390). Application-access-operating-environment continues the boot from this point as a standard operating system's client. The default startup on an application-access-operating-environment client brings up a logon panel.

The RIPL process is controlled by four key files. In order to comprehend the process, it is important to understand the control files, their contents and their relationships. The four control files are:

1. RPL.MAP
2. The boot block definition files (CNF)
3. The file index table (FIT) files
4. The NDISDD.PRO file (network driver description).

An application-access-operating-environment server contains a single RPL.MAP file for DOS, the operating system and application-access-operating-environment, which is located in an \XXXLAN\RPL directory. This file contains requester and server records that define the behavior of the remote IPL service for each requester. Each requesting remote computer system 302 must have a set of server and requester records residing on remote IPL server 306 before remote IPL can occur. Each record in the RPL.MAP file takes up a single line and consists of several fields separated by space characters. Two types of records are defined in RPL.MAP: server records and workstation records. A server record defines how the remote IPL service generates boot blocks for a specific client operating system and network adapter type. Default server records are supplied in the RPL.MAP file when the remote boot service is installed. There is no GUI administration utility to update server records in this file. Workstations booting the same operating system and utilizing the same network adapter type use the same server record.

Requester records specify parameters used when starting a specific requester. Each requester record has a unique adapter ID field, which is used to match a specific machine on the network to that particular record. Requester records are created when Remote IPL requesters are defined on the server. Requester records can be defined either through the command line interface or the GUI. Each requester record has a unique entry in the RPL.MAP file that specifies the appropriate server record. The corresponding CNF file, which is named in the server record, is read.

The contents of the CNF file, the FIT file and the appropriate workstation record are downloaded to the workstation to begin the boot process. Using the FIT file entry contained in the requester record in the RPL.MAP file, the requester remaps file requests until remote computer system 302 completes the boot.

The boot block definition files are located in the directory \XXXLAN\RPL. These definition files define an operating system and the way it is loaded into a remote IPL workstation. A definition file may be required for each type of requester, such as DOS and application-access-operating-environment requesters. A number of defined requesters make use of the same .CNF file. For example, if two workstations boot the same operating system and have the same type of network adapter installed, they use the same boot block definition file.

Every server record in the RPL.MAP file must contain a reference to a valid boot block definition file. A number of default .CNF files are provided for all supported network adapters and operating systems. Typically, it is not necessary to change boot block definition files unless it is necessary to have the remote IPL requester operate with different network drivers. The files are in ASCII format and can be edited with any text editor. Using the boot block definition file, the remote IPL server creates a boot block that is sent to the requester. This transmission occurs at the very beginning of the IPL process.

A file index table is built for each operating system and application-access-operating-environment RIPL client machine at machine create time. DOS remote IPL clients do not require an FIT file. The FIT maps the RIPL client filenames to server filenames (similar to symbolic links on UNIX). Since the FIT is a flat ASCII file, it can be updated using an ASCII editor. The FIT file is appropriate only for mapping files that appear to exist on the boot drive (usually Z:) or a LAN attached drive. All other entries (i.e. local storage devices, hardfiles, CD-ROMs etc.) are ignored.

At RIPL boot time, the RIPL server builds a boot block that is used by the RIPL client. The FIT is included in this boot block. This FIT is used by the micro-FSD (File System Driver), the mini-FSD, and then by the FSD or redirector. A number of default FIT files are provided with the application-access-operating-environment server and application-access-operating-environment. Various FIT files for different operating systems are located in the \XXXXLAN\RPL\FITS directory.

For application-access-operating-environment clients, an FIT may be provided as part of each language client installation. A FIT file consists of a header record specifying the name of the default network share where files can be found. \\BBSRV01\RPLFILES is an example of a header record where the default network share is RPLFILES on server BBSRV01.

The rest of the file consists of filename mapping records. The mapping records consist of two fields on the same line. The first field represents a filename and the second represents the actual location of the file on the server. These records consist of a prototype filename or prefix. That means, they would be filenames or prefixes that are to be mapped, followed by a space and an actual filename or prefix relative to the network share.

FIT files are stored in the \XXXLAN\RPL\FIT directory. Each remote IPL workstation has its own FIT file stored in this directory. The FIT file is identified by the name given to the requester in the LAN server administrator's GUI. For example, the FIT file and location for workstation WSODCLT01, is \XXXLAN\RPL\FIT\WSODCLT01.FIT.

While the depicted example uses RIPL protocol, a boot image could be created for remotely booting any computer configuration that utilizes any remote boot protocol. The depicted example in FIG. 3 and above-described examples are not meant to imply architectural limitations. The description of the preferred embodiment of the present invention has been presented for purposes of illustration and description but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 4:
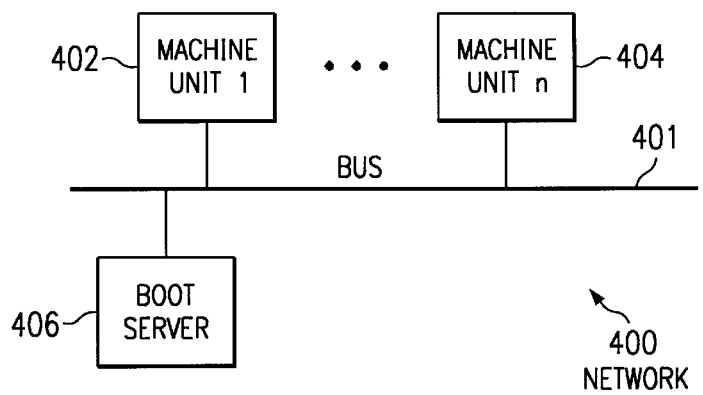
FIG. 4 is a diagram of the basic distributed data processing system and, as in all of the drawing figures, is intended to be exemplary of a preferred embodiment and in no way limits the implementation of the invention.

Referring to FIG. 4, a diagram of the basic distributed data processing system, as in all of the figures, is intended to be exemplary of a preferred embodiment and in no way limits the implementation of the invention. FIG. 4 illustrates network 400, consisting of a plurality of client computers 402–404 connected to network bus 401 and are indicated as machines 1-N. Each client computer is connected along network bus 401 to boot server 406. Server 406 is depicted as a boot server because, in the preferred embodiment, server 406 stores the files and parameters needed for booting each of the unique client computer systems 402–404.

In the normal operation of a stand-alone computer system, a user issues a boot command to the client computer. The two client computers respond to the boot command by retrieving the configuration data files (CONFIG.SYS) needed to configure the specific machine with the hardware parameters. These files also contain information needed to initialize the video, printers and peripherals associated with that particular machine, for instance, the specific video, printer, peripheral and other hardware parameters needed for that particular machine. Finally, upon receiving a boot command, the client computer automatically retrieves machine addresses, such as the TCP/IP addresses, and the like.

In a system where the client computers have no storage means, in other words, diskless-type client computers, the remote client computers themselves cannot retrieve boot information from within the client. In this case, the client (for instance computer system 402) sends the boot request via network bus 401 to boot server 406.

Figure 5:
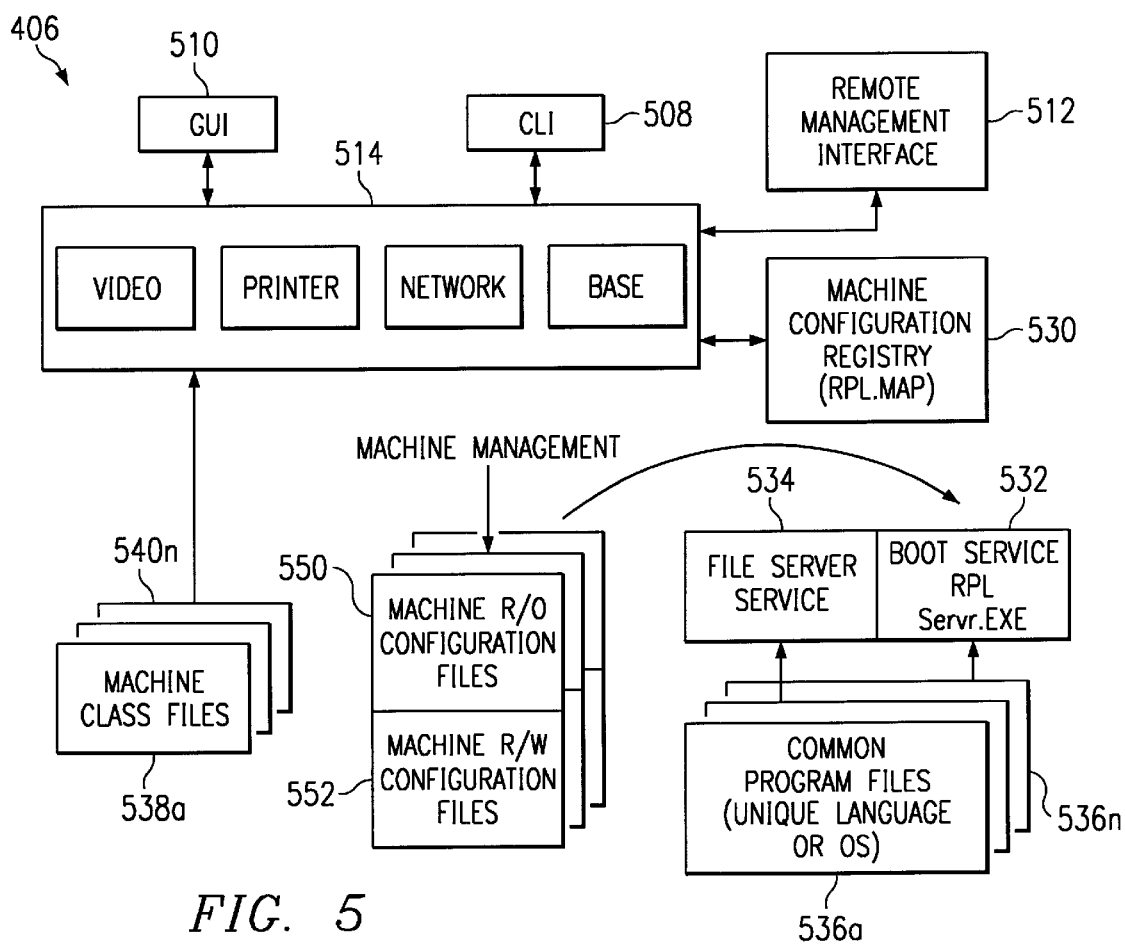
FIG. 5 illustrates the configuration of boot server 406 as disclosed in the present invention.

FIG. 5 illustrates the configuration of boot server 406 as disclosed in the present invention. A boot command issued by a client computer, such as remote client computers 402–404, is received at boot server 406 through remote manager interface 512. If the machine definition files exist, file server service 534 and boot service 532 process the boot request with a machine configuration file RPL.map and boot the remote client computer which issued the boot request. The remote client computer can then be used normally. Machine definitions are created based on prototypes or templates called machine classes. If no machine class file exists in machine configuration registry 530, a machine class must be created for the unique client computer system. A user may create machine class files using GUI 510.

In FIG. 5, GUI 510 is shown within boot server 406. However, other embodiments are possible. For example, GUI 510 may be accessed through the remote client computer being booted, rather than through the boot server. Other alternate embodiments are also possible, such as the GUI being part of a second remote computer system not being booted but providing access to the machine management for creation of machine classes for the client being booted.

Additionally, machine management 514 is connected to machine class files 538a–540n. Examples of the content of the machine class files include:

CONFIG.SYS (a set of hardware specific entries)
AUTOEXEC.BAT
WIN.INI
SYSTEM.INI
OS2.INI
OS2SYS.INI
XXXX.FIT (file mapping for machine classes, such as driver names overwritten to a new location)
Device-specific directories that include the device drivers control and data files needed to support:
Video adapter
Sound card
DASD type
CD-ROM
Keyboard
Mouse
Other devices, such as a scanner, badge reader, etc.

In other words, the machine class files actually consist of all of the files of default values and program files used to create and configure a boot image for a particular machine of a particular configuration. The machine class files are copied and customized for a particular remote computer system, and a set of read-only configuration files 550 and read/write configuration files 552 are created for this specific client computer using the process described in FIG. 6. File server service 534 and boot service 532 access the machine read only configuration files and machine read/write configuration files much as they would if the files were mapped in the RPL.map file stored on machine Configuration registry 530. An instance of the configuration files are then used by file server service 534 for booting remote computer system 402. Both file server service 534 and boot service 532 are connected to a base of common program files 536a–n. These common program files include most of the program files for the operating system. Because there is a possibility that each remote client computer may have a unique operating system, common program files 536a–n support different languages and different operating systems.

Figure 6:
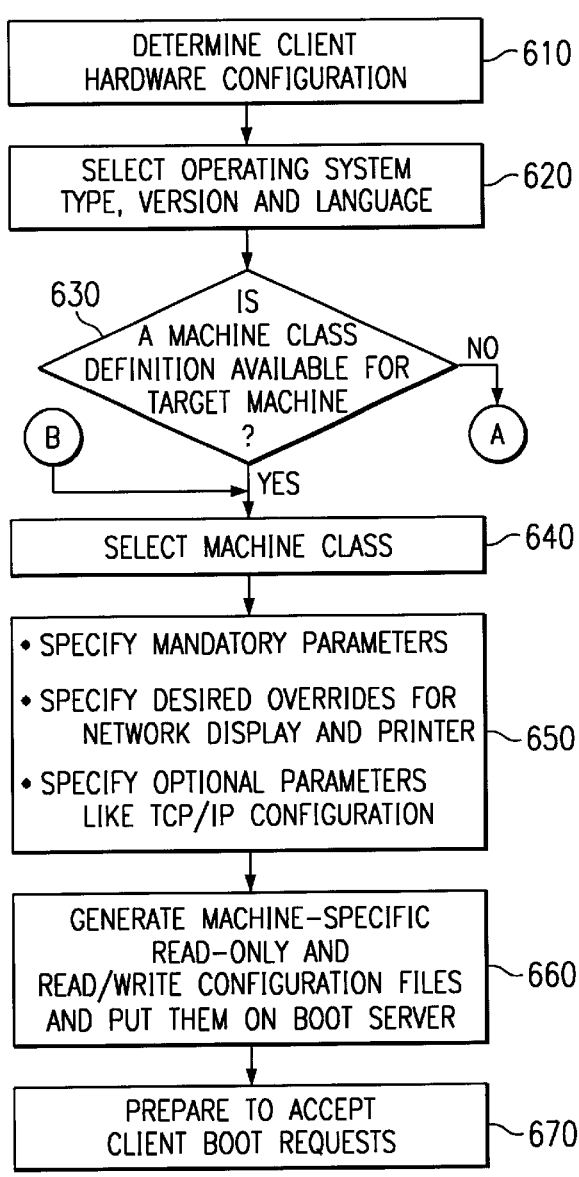
FIG. 6 is a flowchart representing machine class usage as implemented in the boot server of FIG. 5 in accordance with a preferred embodiment of the present invention.

Turning now to FIG. 6, a flowchart of a process for machine class usage as implemented in the boot server of FIG. 5 is illustrated in accordance with a preferred embodiment of the present invention. This process illustrates how the machine definition files (i.e., machine read-only configuration files 550 and machine read/write configuration files 552) are created from machine class files 538a–540n for a specific remote computer system.

Initially, to configure the operating software for a remote client computer, a determination must be made as to the client hardware configuration (step 610). Once client hardware configuration has been determined, an appropriate operating system type, version and language must be selected for that particular client hardware configuration (step 620).

Next, the administrator checks to see if a machine class is available that matches the hardware configuration of the target remote computer system (step 630). If no machine class matches the target remote computer system, then a new one must be created using the machine class creation process outlined in FIG. 7. Alternatively, if a matching machine class definition is available, that machine class is selected at step 640.

Once the machine class is selected, the files in the machine class are used as the template in creating the specific read-only and read/write configuration files for the target remote computer system. The administrator needs to supply mandatory parameters like the hardware MAC address of the client and the client ID.

In step 650, certain values inherited from the machine class can now be modified for the particular remote computer system. Examples of values that have overrides include the video display and the video resolution. In addition, the administrator may specify optional parameters like the TCP/IP address and hostname, in case TCP/IP support is selected to be made available on that remote computer system.

In step 660, these selections and overrides are used to generate machine read-only and read/write configuration files 550 and 552, respectively, for that particular remote computer system. The files generated using this process are copied into the specific directories set up on boot server 406.

This methodology is repeated for every target remote computer system that needs configuration of its operating system image on the server. Once the configuration files for a particular remote computer system are generated, machine configuration registry 530 is updated and boot service 532 is set up to respond to boot requests from the remote computer system (step 670).

Figure 7:
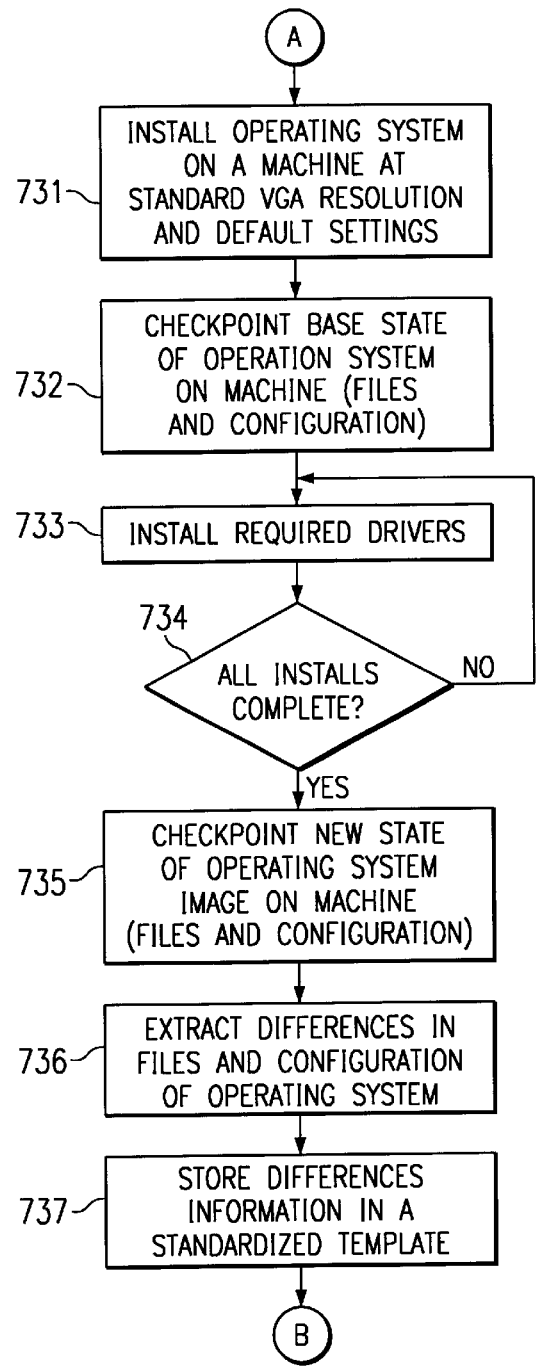
FIG. 7 depicts the creation of a machine class.

FIG. 7 depicts the creation of a machine class. In this example a CPQ5120E machine class, CPQ5120E.MC, is created for a client Compaq Prolinea 5120e configured with an ISA bus and a Cirrus Logic 5434 video adapter. In this example, rather than creating the machine class from a generic ISAVGA.MC and having to provide an .FIT table, a prototype machine class CPQ5120E.MC is available from machine class files 538a–540n in boot server 406. However, the prototype machine class .MC does not sufficiently define the video adapter chipset.

Importantly, the first step in creating a machine class is to determine which of the existing machine classes included in machine class files 538a–540n in boot server 406 is the appropriate choice for the given machine class prototype (not shown in FIG. 7). The use of a prototype greatly simplifies the process of creating a machine class. There are two rules for selecting the appropriate prototype:

1. If an existing machine class exactly matches the video subsystem, get the machine class and use it as the prototype machine class.

The first rule concerns the type of video subsystem support that is required. Configuring a machine class for video support is the most complex and tedious of all machine class requirements. For this reason, if it is determined that the target system's video subsystem exactly matches one of the supplied machine classes, it should be used as the prototype and modified to the other hardware components as needed.

2. In all other cases, use the generic ISA/VGA machine class as the prototype.

The generic, or ISA/VGA, machine class provides support for the most basic hardware capabilities. Starting with these most basic capabilities, a machine class can be created to the hardware requirements of the target application-access-operating-environment client machines.

The first phase is to enable the new machine class to appear in the boot server's administration GUI as a new, selectable entry. The GUI information is provided by the CPQ5120E.INI file in the D:\XXXXLAN\RPL\MACHINES\BB10.US\CPQ5120E.MC subdirectory. Before working with the file, the copied ISAVGA.INI is renamed to CPQ5120E.INI. Using an INI-file editor, all data entries for the machine class application are reviewed to ensure that they are correct. FIG. 17 illustrates entries that are found in the CPQ5120E.INI file.

Returning to FIG. 7, an operating system is installed on a machine at standard VGA resolution and default settings (step 731). If the objective is to enable the Aapplication-access-operating-environment server administration GUI to provide the option to change the monitor and video resolution information, the two keywords VIDEO_MONITOR and VIDEO_RESOLUTION must be deleted. A correct implementation of this function requires a VIDEO.CFG and an SVGADATA.PMI file from the new machine's driver installation. Steps 610 and 620 having been completed, the new machine class now appears in application-access-operating-environment server administration GUI 510.

Returning again to FIG. 7, the remote computer system check points the base state of the operating system image (step 732). After installing VGA support and verifying that the remote computer system will boot, a snapshot file is created that captures the name, size and date of every file on the boot drive, for example:

ATTRIB -r -h * /S DIR C:\*.* /S /O:GN > PRESVGA.DAT

The name, date and size of these captured files provide a basis for determining which files are copied and renamed as a consequence of installing the Cirrus 5434 SVGA support. Next, remove the archive bit from all files on the boot drive prior to installing the Cirrus 5434 VGA support. For example:

ATTRIB -A C:\*.* /S

This step provides a method to verify which files are touched during the installation of Cirrus 5434 SVGA support. In order to re-create the changes to the OS/2 system files, backup copies of the following files are created:

CONFIG.SYS

AUTOEXEC.BAT

OS2.INI

OS2SYS.INI

WIN.INI

SYSTEM.INI

Once this has been done, the appropriate drivers are installed for the remote computer system (step 733). It is important to note that the installation facility installs support for the Cirrus Logic 5434 video adapter. For the video resolution, if the objective is to provide the system administrator with maximum flexibility when configuring a client computer, the video resolution should not be changed after installing SVGA support. Changing the video resolution creates an entry in the client computer's OS2.INI file that adjusts resolution to whatever choice is made after installation. By not changing the video resolution at this point, the system installation facility installs support for the Cirrus Logic 5434 video adapter.

The system is checked to see that all installs are complete (step 734). If not, the process loops around and installs the remaining appropriate drivers. Once all installs are complete, the operating system is again check pointed for the new state of the operating system image on the remote computer system (step 735). A second snapshot file captures the name, size and date of every file on the boot drive after installing SVGA support, for example:

ATTRIB -r -h * /S

DIR C:\*.* /S /O:GN > POSTSVGA.DAT

Then, all changed OS/2 system files are captured. In order to re-create the changes to the OS/2 system files, the user needs to recapture the following changed files:

CONFIG.SYS

AUTOEXEC.BAT

OS2.INI

OS2SYS.INI

WIN.INI

SYSTEM.INI

With these files in place, the user can determine the changes made during the installation of SVGA support (step 735). When saving these files into the same subdirectory as the ones prior to the SVGA installation, it is important that they be uniquely named so they can be easily differentiated from the original files.

After the system files have been recaptured, it is necessary to capture the names of all the files that were affected by the installation of the required drivers needed for the remote client computer, in this case, the Cirrus Logic 5434 SVGA installation. This can be done by checking for those files whose archive bits were stripped in a previous step, for example:

DIR C:\*.* /S /AA > ATTRIB.DAT

Now that the user has a method of identifying the files that were affected by installing the Cirrus Logic 5434 video adapter, the user can proceed with creating a machine class including all of the files of default values and program files used to create and configure a boot image for a particular target machine of a particular configuration.

Finally, the differences in the files and configuration of the operating system are checked (step 736). This is accomplished by a close examination of the ATTRIB.DAT file, which provides a list of all files affected by the installation process. A sample list and comments are provided as examples to aid in determining which files apply to specific circumstances. See FIGS. 18a–18d.

The difference information is stored in a standardized machine class template (step 737) as a machine class file for the remote computer system class.

Figure 19:
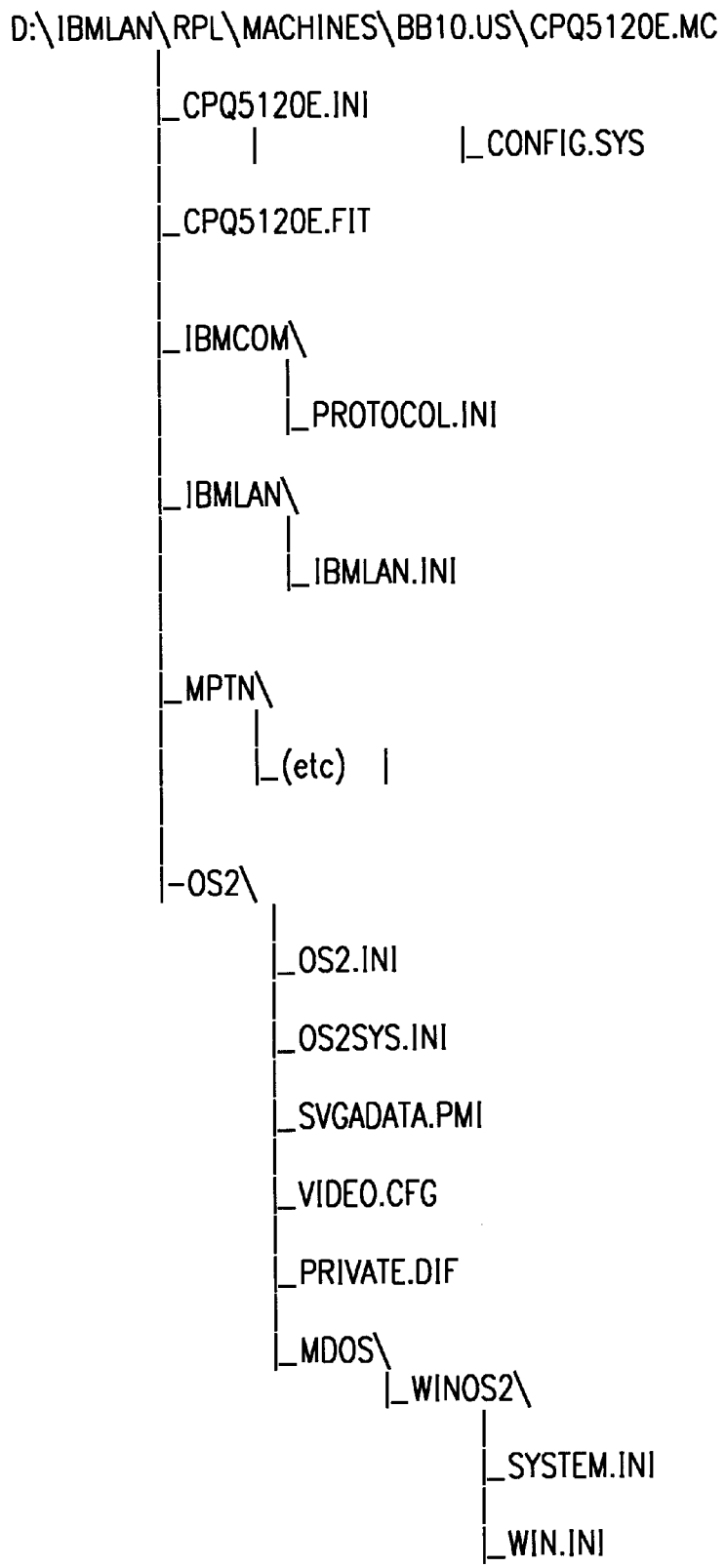
FIG. 19 is a diagram of the CPQ5120E subdirectory structure.

FIG. 19 is a diagram of the CPQ5120E subdirectory structure. This is where the user places all of the required files identified by examining the ATTRIB.DAT file in previous steps 731–737.

Not all of the marked files in ATTRIB.DAT are placed in the machine class subdirectory. The video driver files are placed under the application-access-operating-environment RIPL tree, which requires creation of a new directory for the following Cirrus Logic 5434 drivers:

CD D:\XXXXLAN\RPL\BB10.US\OS\VIDEO
MD CL5434

Next, the display driver files (i.e., CIRRUS.DLL, DISPLAY.DLL, BVHSVGA.DLL, and VIDEOPMI.DLL) are copied into the newly created directory. Note that the CIRRUS.DLL file is renamed to CL5434.DLL for better readability. This is especially desirable when installing several versions of display drivers to support multiple machine classes.

The FIT file CPQ5120E.FIT provides the system with a remapping facility pointing to the new location of the video drivers. See FIG. 20.

In order for the new video drivers to be loaded at startup time, CONFIG.SYS must be modified. To determine exactly which lines were changed due to the Cirrus installation, the user should use a file comparison tool to show which lines are different in both versions of the CONFIG.SYS files. The comparison of the changed lines is shown in the example of the CONFIG.SYS file below.

```
REM **** NCVIDEO BEGIN ****
DEVINFO=SCR,VGA,Z:\OS2\BOOT\VIOTBL.DCP
SET VIDEO_DEVICES=VIO_SVGA
SET VIO_SVGA=DEVICE(BVHVGA,BVHSVGA)
DEVICE=Z:\OS2\MDOS\VVGA.SYS
REM **** NCVIDEOEND ****
```

An INI editor is used for a detailed examination of the OS2.INI files. Because OS2.INI files contain binary data, several REXX command files that manipulate the content of individual OS2.INI files are provided.

The following procedures are implemented to make and apply all necessary changes to the OS2.INI files:

1. The INICREATEDELTA4.CMD file is used to create a DELTA.INI file. This command file requires as input two INI files.

In the current example, the two INI files are called OS2VGA.INI and OS2SVGA.INI. The OS2VGA.INI file is the copy of the OS2.INI file from the OS/2 Warp Version 4 system that supports the video adapter in VGA mode, and the OS2SVGA.INI file is the copy of the OS2.INI file from the same OS/2 Warp Version 4 system after the SVGA support for the video adapter was added to the machine class.

The INICREATEDELTA4.CMD procedure looks for any new or changed application data, keywords or data entries in the OS2SVGA.INI file and puts those into the DELTA.INI file.

2. Next, the user edits the DELTA.INI file manually with an INI file editor to ensure that only necessary changes remain in the new CPQ5120E's OS2.INI file.

In the current example, the following two application entries are required:
   PM_DISPLAYDRIVERS
   This particular application is required for all the Cirrus Logic device information. It is also necessary to ensure that there is no keyword, like DEFAULTSYSTEMRESOLUTION, in the file. If there is, this keyword must be deleted. The user should also manually add the keyword RESOLUTION_CHANGED with a data entry of 1.
   WIN_RES_. . .
   There are several entries of this kind which are required by the WINOS2 environment in order to change to another video resolution.

3. The INIMERGE.CMD is run using the target's (CPQ5120E) OS2.INI and DELTA.INI file names as input to the command. This command merges the delta into the new machine class INI file.

After producing a new OS2.INI file that is used in the new machine class subdirectory, it is necessary to check for changes in the OS2SYS.INI file as well. However, in this specific installation example, these entries in the file are unchanged, so the update procedures are unnecessary in this specific case.

The WIN.INI file, unlike the OS2.INI files, is a pure ASCII file and does not contain binary data. Since it is an ASCII file, a file comparison tool is used to determine what changes were made to WIN.INI. In the current example, the following changes are discovered and must be added to the new, updated WIN.INI file.

```
[Desktop]
IconSpacing=100
```

A file comparison tool is used again to determine what changes were made to the SYSTEM.INI file. In this example, the changes shown in FIG. 21 are discovered and must be added to the updated SYSTEM.INI file.

With the above-described changes completed, the new CPQ5120E machine class can now be used to create new RIPL requesters for client machines. Once created, the new machine class can be stored in machine class files 538a–540n for future boots or for modifying other machine classes.

While any machine class can be created from nothing, other API codes make it possible to reduce the amount of effort required to create a valid machine class. For example, the parameters in a prototype machine class which is available to the user can be modified. Alternatively, the prototype machine class can simply be copied and renamed if its parameters are identical. Listed below are machine class creation APIs which are available to the user, along with their functionality.

| MACHINE CLASS CREATION APIs | |
|---|---|
| Create | Create a new machine class from specified information. |
| Set | Modify the specified machine class. |
| Get | Get the information on the specified machine class. |
| Enumerate | Enumerate the names of the machine classes available. |
| Delete | Delete the specified machine class. |
| List Parm Enum | List the available selections for the specified parameter(s) (e.g., for the video type parameter, list the available video types) |

These APIs provide the user with a wide range of executables for creating and modifying machine classes. For instance, Create enables the user to create a machine class code from specific parameter information provided by the user for a particular class of machines. The Set command allows the user to modify a machine class that is already available. The Get command allows the user to specify a specific machine class, which can then be modified and set. The Enumerate command lists the names of machine classes available and allows the user to see generic and prototype machine classes. The user can then select the machine class that is most appropriate for the client machine needing a class for booting. The Delete command enables the user to delete specific classes of machines that are no longer supported by the server or are no longer in the network. Finally, the List Parm Enum, or the parameter list command, allows the user to list the available selections for a specified parameter. For instance, when the user selects a specific parameter, such as a printer or video type, the list parameter call lists the specific printers or video types supported by the server.

Figure 8:
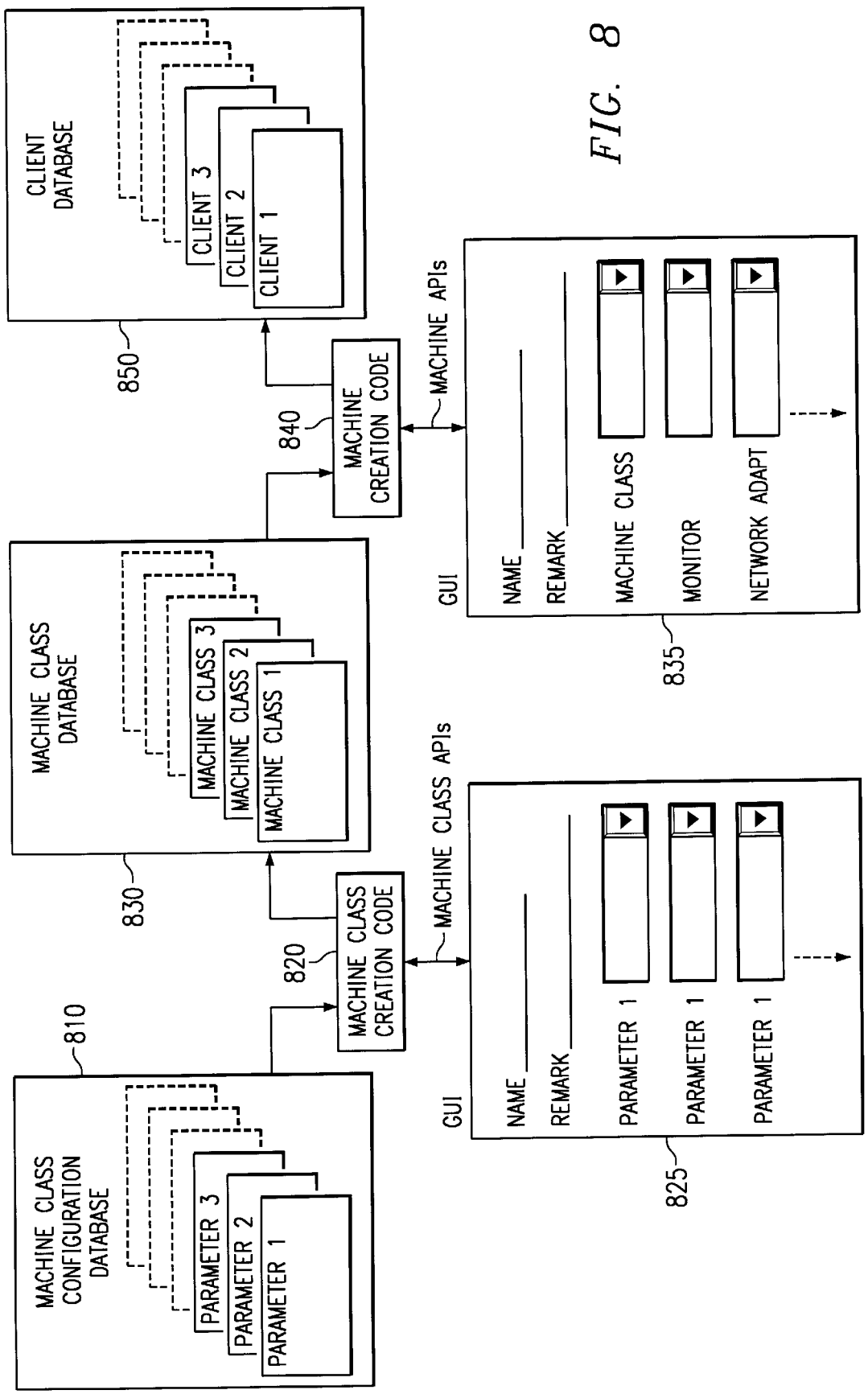
FIG. 8 further illustrates a method of the present invention used in conjunction with a GUI.
Figure 9:
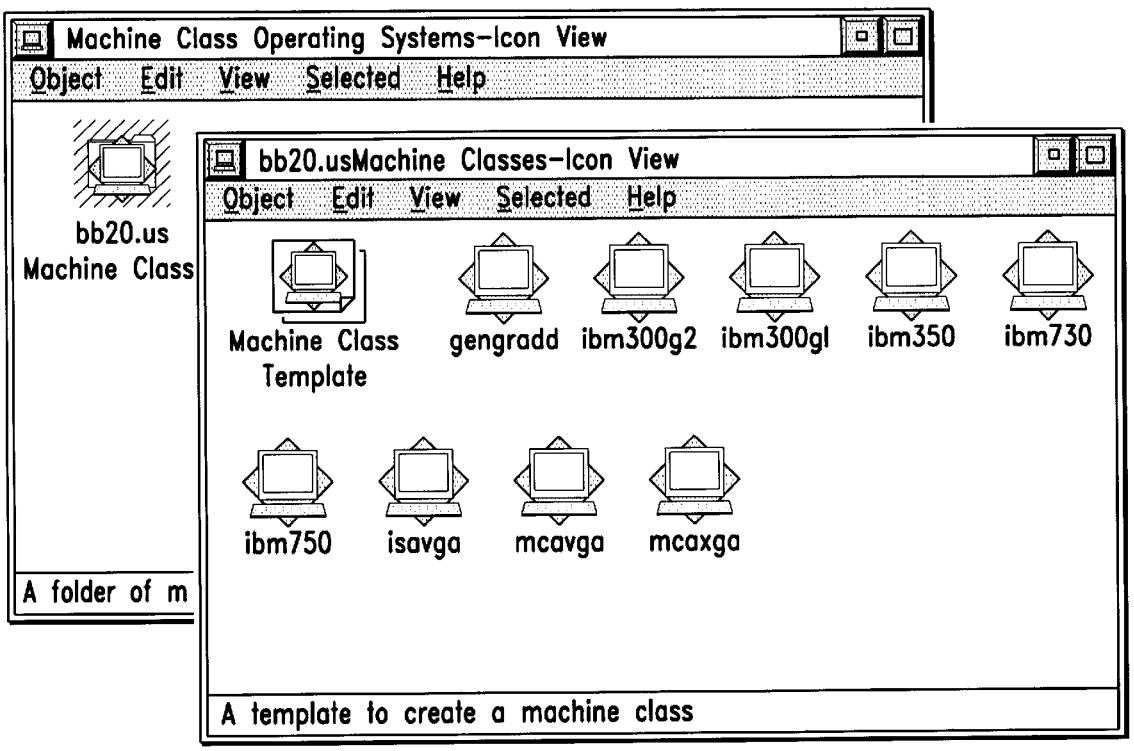
FIG. 9 is a screen shot of the machine class folder.

FIG. 8 further illustrates a method of the present invention used in conjunction with a GUI. Although it is not readily apparent from the outset, FIG. 8 depicts the creation of a machine class within a selected operating system. In other words, a precursor to creating a machine class is the designation of the operating system in which the machine class will reside. FIG. 9 is a screen shot of the machine classes folder residing in the operating system folder.

Using the Create command, machine class creation code 820, the user initializes GUI display 825 for creating a machine class. An initial view of GUI display 825 is shown in FIG. 8. Upon receiving GUI display 825, the machine class must be identified. The user merely enters a name and a description of the machine class. The description should be accurate enough that anyone looking for a prototype class to clone would recognize the similarity between the prototype machine class and the client configuration.

In one embodiment of GUI 825, a notebook metaphor is used to facilitate entry of machine class creation information shown in FIGS. 10–14. Information in the notebook is entered in a similar fashion as in a real notebook in that a series of pages, which are ordered in importance, are written to.

Figure 10:
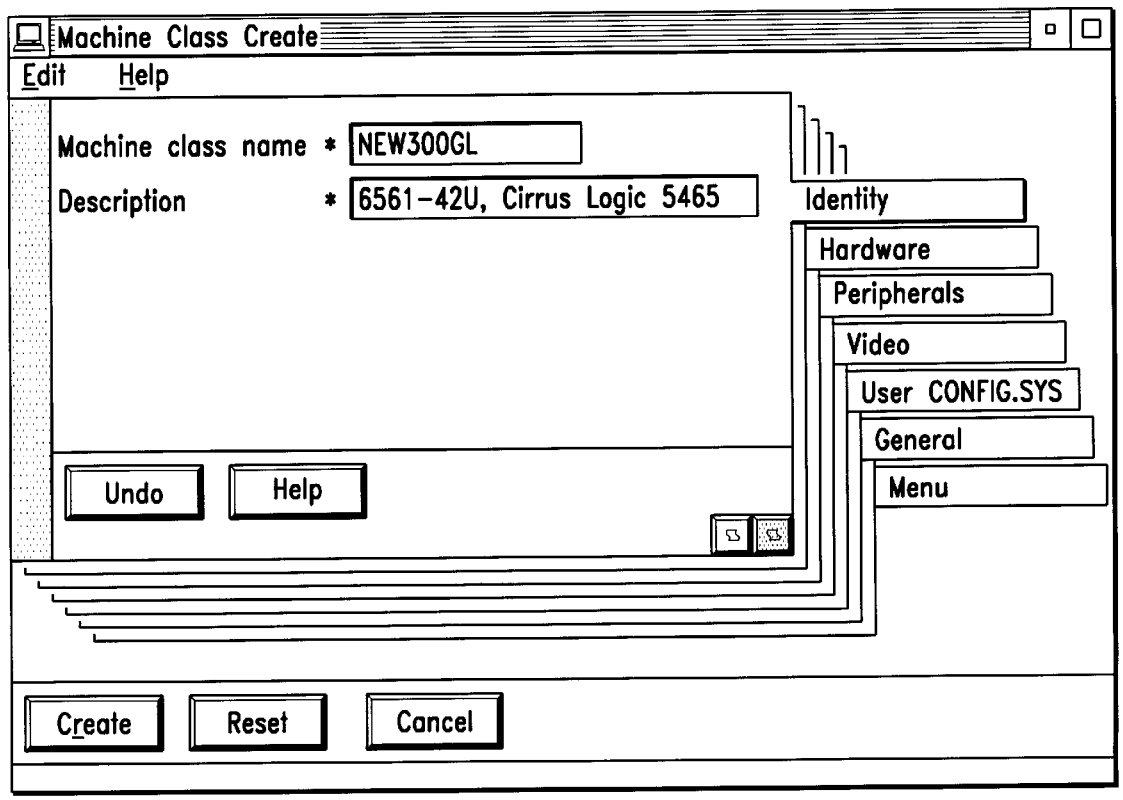
FIG. 10 is the identity page of the machine class create notebook.

Depicted in FIG. 10 is the identity page of the machine class create notebook. The machine class identity is given as NEW300GL, and a description of the machine class, 6561-42U, Cirrus Logic 5465. Note that the example used with FIG. 7 is that of a Compaq Prolinea 5120e configured with an ISA bus and a Cirrus Logic 5434 video adapter. A description for that example might be 5120E, Cirrus Logic 5465, ISA.

Importantly, the description page is the only user input in which a menu bar must be filled in by the user. As will be seen below, every other aspect of creating a machine class from GUI 825 is a point and click operation, thereby saving work and lessening the chance of errors which would interfere with RIPL operation.

Once identified, the user may select parameter files from machine class configuration database 810 via GUI 825. Machine class configuration database 810 includes files of parameter information. Parameter information includes configuration parameters for hardware, peripherals, video and printers. Typically, this database contains configuration files including such hardware elements as keyboards, local printers, remote printers, video types and parameters, network adapters, bus types, CD-ROM types, hard drive types (SCSI, IDE, etc.) mouse types, and internationalization parameters (codepage, language, locale, etc.) The user selects the parameter files needed for the machine class of the client machine.

One popular method is through the use of drop-down lists as depicted in GUI display 825. Each file contains information needed to initialize drivers for the video, printers and peripherals associated with a particular machine (for instance, the specific video controller, or the specific printer, or the peripherals, or other hardware parameters, such as manufacturer, model, type, series number, etc. needed to identify particular parameters and drivers for the client machine class).

Past information entry methods relied on the user accurately editing the data structure associated with the parameter file. In the Cirrus Logic 5465 video adapter example, setting the parametric information includes performing several manual entry operations that are time consuming and increase the chance of user error. The user first changes the video type to the proper numeric value not currently being used by another video adapter, for instance, from MC_VIDEO_TYPE_01 to 07. Next, the object title has to be changed to the appropriate type video adapter, Object-Title [0] field to Cirrus Logic 5465. And finally, the value field within the variable section to the model or series of the object has to be changed, in this example to VALUE=5465 or CL5465.

In the present invention, parameters can be either entered in the menu bar similar to conventional methods or simply by selecting the correct parameter information from the drop-down list. Rather than typing the information in the menu bar, the user merely clicks on the selection and returns the menu.

GUI 825 is exemplary of GUI display and tool options and in no way is meant to limit or define the invention. GUI 825 includes a separate parameter menu bar for every possible configuration of a client. It can be easily seen that the application of the present invention reduces the amount of user error while increasing the speed at which machine classes can be created. The overall efficiency of the user is thus increased without any sacrifice in system flexibility.

Figure 11:
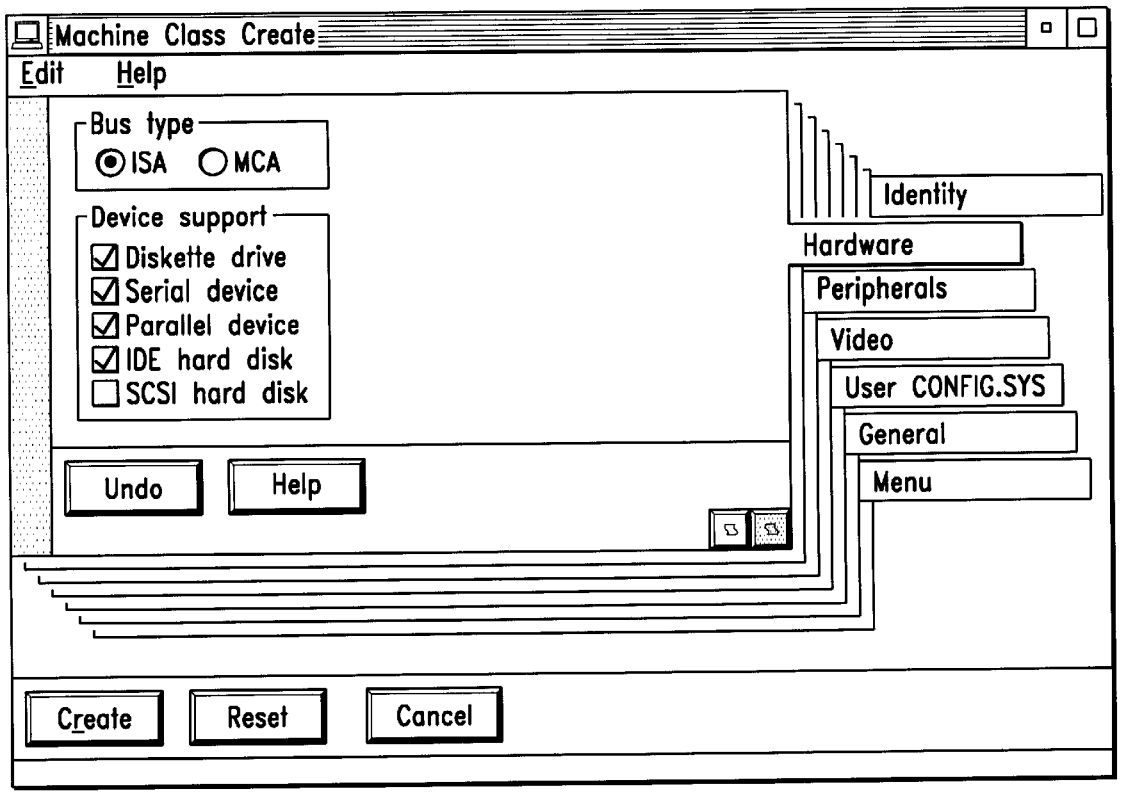
FIG. 11 is a screen shot of the hardware page in the machine class create notebook.

FIG. 11 is a screen shot of the hardware page in the machine class create notebook. FIG. 11 depicts another possible embodiment of graphical user interface 825. GUI

825 might be configured as radio button or check box options for the user to select parameters from. Again, the user simply selects an appropriate hardware parameter from choices available on the hardware page and clicks on the radio button or box associated with that choice.

Figure 12:
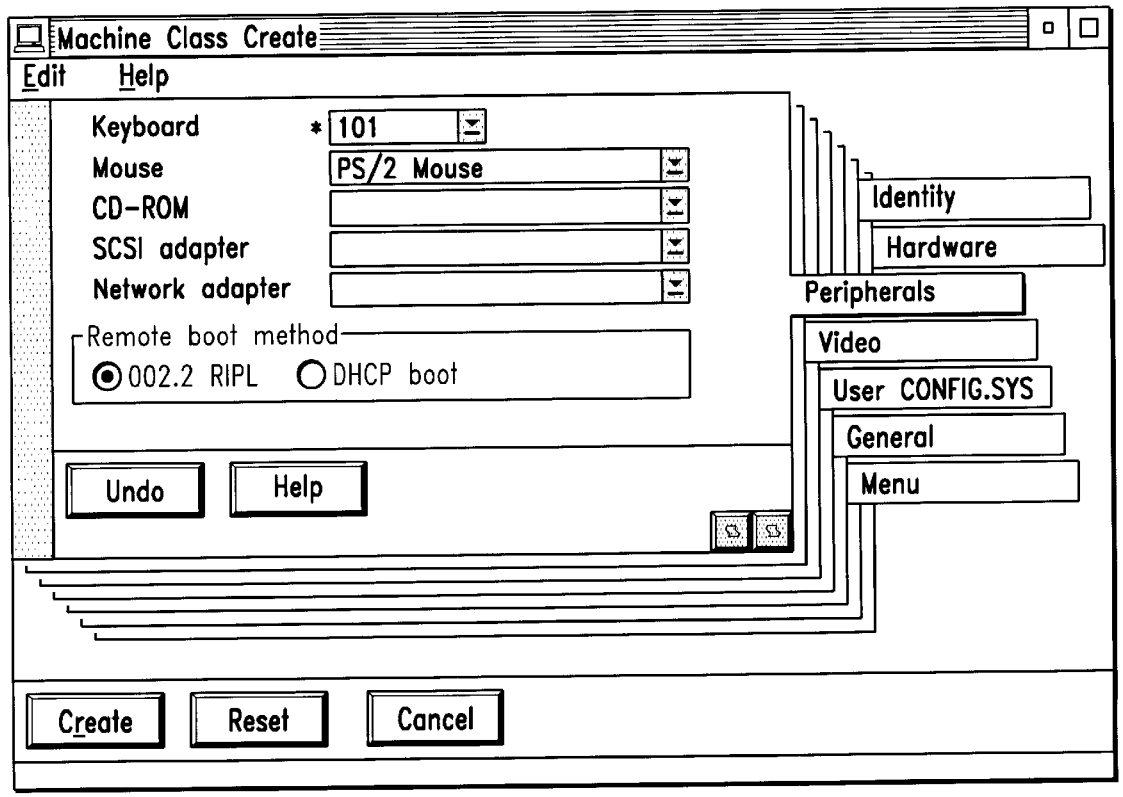
FIG. 12 is a screen shot of the peripherals page in the machine class create notebook.

FIG. 12 is a screen shot of the peripherals page in the machine class create notebook. The menu bars illustrated in FIG. 12 are similar to those illustrated in FIG. 8. On the hardware page, the user may select from a variety of hardware types within each of the hardware parameters. As illustrated in FIG. 12, the user selects a 101 keyboard type in the keyboard parameter drop-down list and it appears in the menu bar. Similarly, a PS/2 mouse hardware type is selected in the mouse parameter menu bar.

Figure 13:
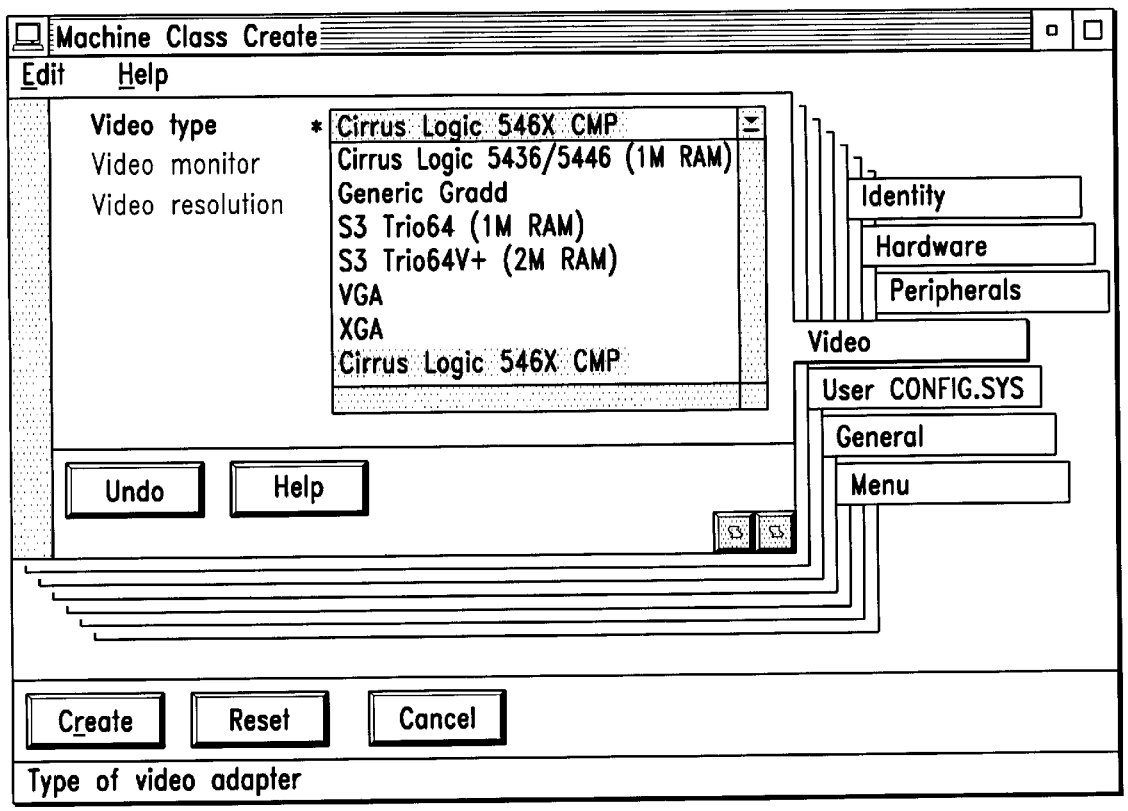
FIG. 13 is a screen shot of the video page in the machine class create notebook.

FIG. 13 is a screen shot of the video page in the machine class create notebook. FIG. 13 is a screen shot illustrating the selection process on a drop-down list. Here it is plainly seen that the drop-down list method of selecting parameter information is unmistakably superior to the data entry method used on the prior art. In FIG. 13 the user selects a parameter by clicking on a hot spot associated with the screen space of the parameter. The hot spot is usually the menu bar and the parameter name. In this example, the parameter is the video type.

In response to the user contacting a hotspot with the mouse pointer, a visual response from GUI 825 is sent to the user in the form of a change in the character of the display associated with that parameter. Usually, the response is a color or intensity change in the parameter name or the border of the menu bar associated with the parameter, or both. Another visual response is temporary expansion or opening of the drop-down list as the user contacts a hot spot, as shown in FIG. 13. This response need not require the user to click on a parameter hot spot, but it might, depending on the type of interface. Upon opening the list or dropping it down, the list becomes part of the hot spot associated with the parameter and temporally remains in the dropped position as long as the pointer remains in contact with any hotspot, including the dropped list.

Other drop-down list functions are also envisioned, such as permanently dropping the list by clicking on a hot spot. FIG. 13 illustrates a permanently dropped list.

Upon the selection of a parameter name and the opening of its list, the user then selects the appropriate choice for parameter type from the parameter types available. Again, in an effort to reduce possible error in the selection process, as the pointer contacts a hot spot associated with a parameter type, GUI 825 again responds with a visual cue, evidencing the pointer position with respect to the parameter types. FIG. 13 illustrates the Cirrus Logic 546X chip set being highlighted on the drop-down list, as well as being highlighted in the menu bar. In order for an entry on the parameter list to appear in the menu bar, the user must initiate the move by clicking on the entry or some other physical action on a parameter type in the drop-down list. Another possible action is for the user to drag a selection from the drop-down list and place it in the menu bar using either the mouse or keyboard.

Figure 14:
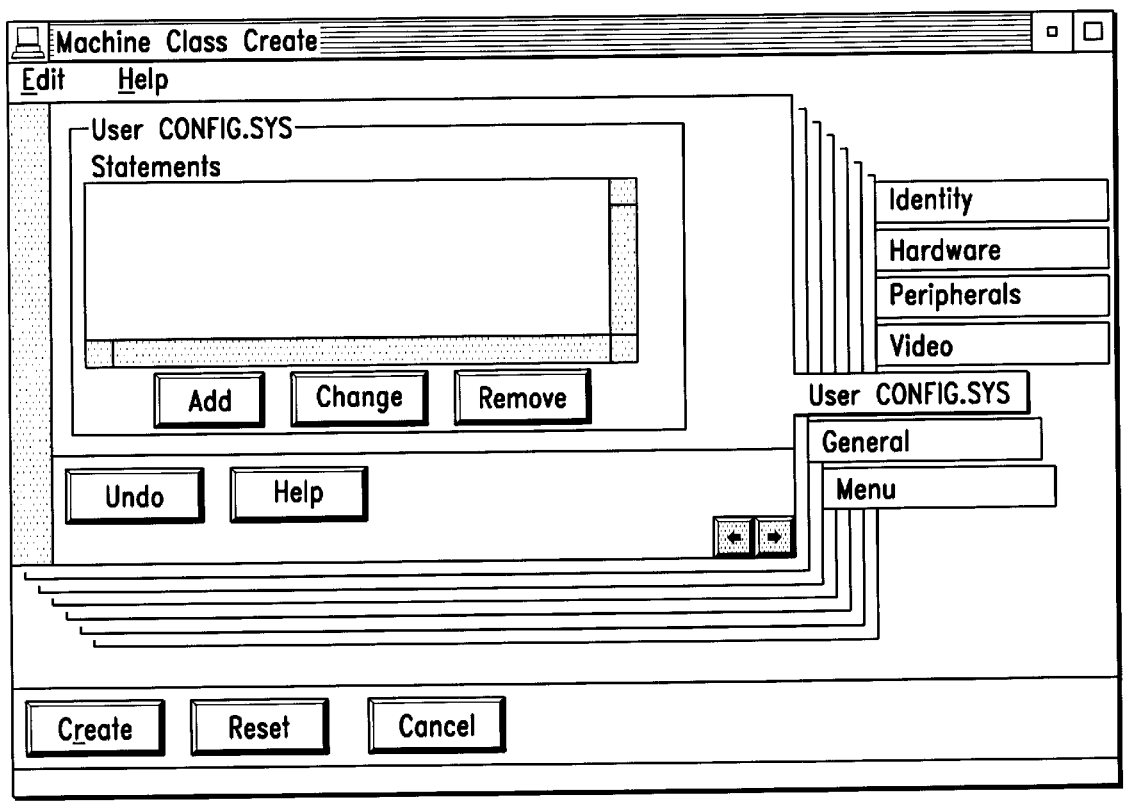
FIG. 14 is a screen shot of the user CONFIG.SYS page of the machine class create notebook.

Once the user is satisfied that the correct parameter has been activated and the correct parameter type appears in the menu bar, the selection process is complete. FIG. 14 is a screen shot of the user CONFIG.SYS page of the machine class create notebook. In the discussion of FIGS. 10–13 above, the parameter selections made through GUI 825 were essentially building a CONFIG.HW file for a machine class. Alternatively, hardware devices which require one or two entries on the client's CONFIG.SYS could be entered and added directly to the client's CONFIG.SYS file. In the present example, however, all the necessary parameters have been selected from the drop-down lists on the preceding pages in the machine class create notebook. No further CONFIG statements are needed.

Once created, the machine class is stored in machine class database 830 along with other machine classes that have been created. Again referring to FIG. 9, note that the machine classes folder contains a machine class template. The parameter information of the newly created machine class is copied to a standardized machine class template. Then the newly created machine class appears along with its identity on the machine classes folder. A user can create one or more machine classes as described above, and view the results on the machine class folder.

Once a machine class database is created, the user can access any one of the machine classes and modify each separately. Machine creation code engine 840 is similar to machine class creation code engine 820 in that specific machine calls are used to create individual client machine configurations. Using graphic user interface 835, which is similar to GUI 825 used for creating the machine classes, GUI 835 presents the user with another point and click interface, again saving work and lessening the chance of errors which would interfere with RIPL operation.

Initially, the machine name is given, which identifies the client machine, and characteristic descriptive information is entered in the remarks. The description should be accurate enough so that anyone looking for a client machine can recognize it by the name and description. A compatible machine class is selected from machine class database 830 via the drop-down list associated with the machine class menu bar illustrated on GUI 835. In one embodiment of GUI 835, a notebook metaphor is used to facilitate entry of client create information shown in FIGS. 15–16.

Figure 15:
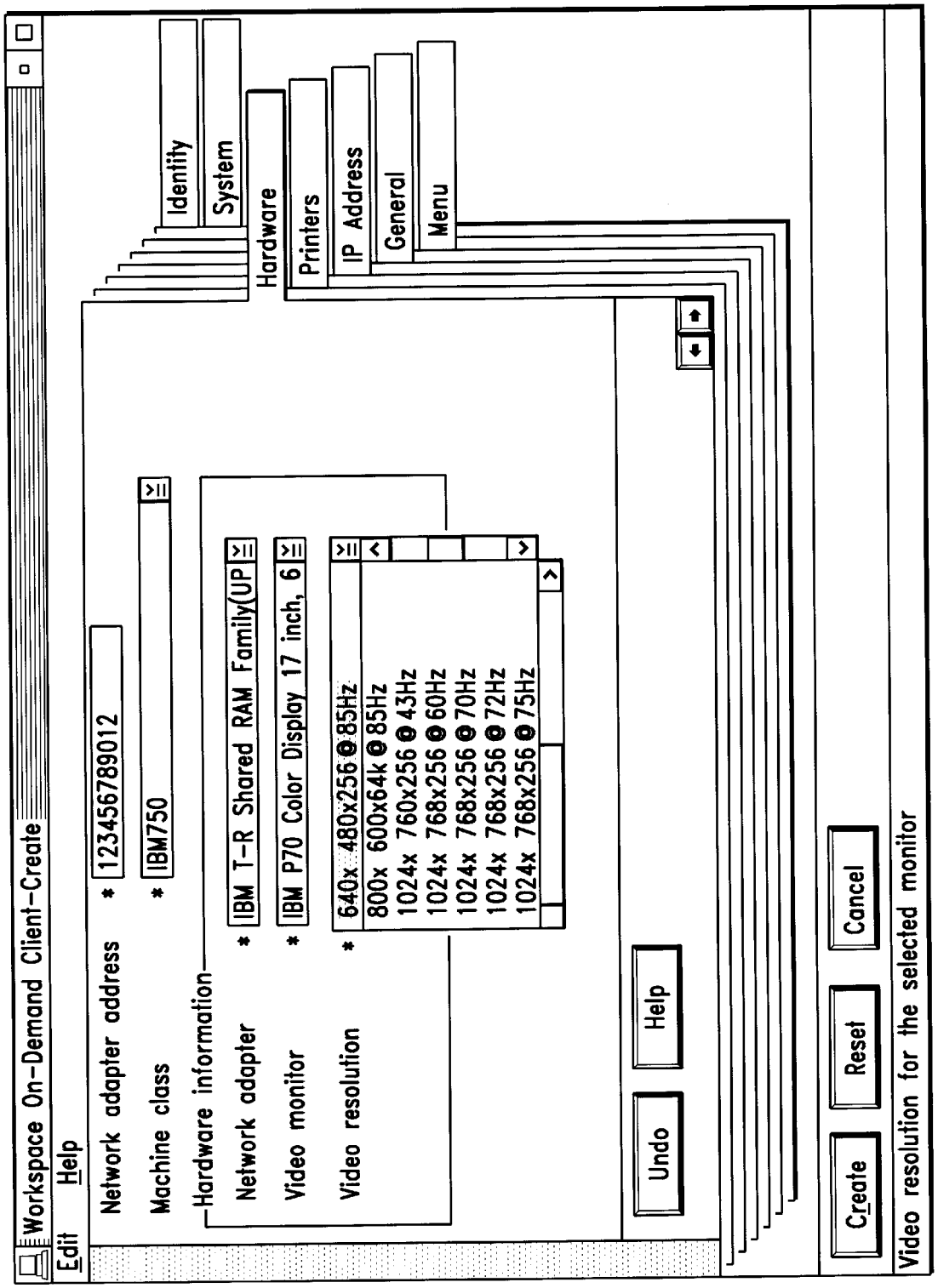
FIG. 15 is a screen shot of a hardware page of the client create notebook.

FIG. 15 is a screen shot of a hardware page of the client create notebook. The notebook metaphor and GUI interface tools in the client create notebook are similar in all aspects to those described above with respect to machine class create notebook.

Not shown in the figures are the identity page and the system page. Upon receiving GUI display 835, the client must be identified, and the identity page is filled in. The user merely enters a name. The system page is similar to the description of the machine class and must be entered into the system page.

In FIG. 15, the network adapter address is displayed automatically for the client next to the network adapter address menu bar. The user then selects the machine class from those available from the machine classes folder, which displays the machine classes stored in machine class database 830. Once the machine class and network adapter have been established, the process of modifying the selected machine classes for storage in client database 850 needs to proceed with the selection of client-specific hardware devices, such as the network adapter, the video monitor, and the desired resolution of the selected monitor. A similar procedure is followed for entering the printer information on the printer page (not shown in the figures).

Figure 16:
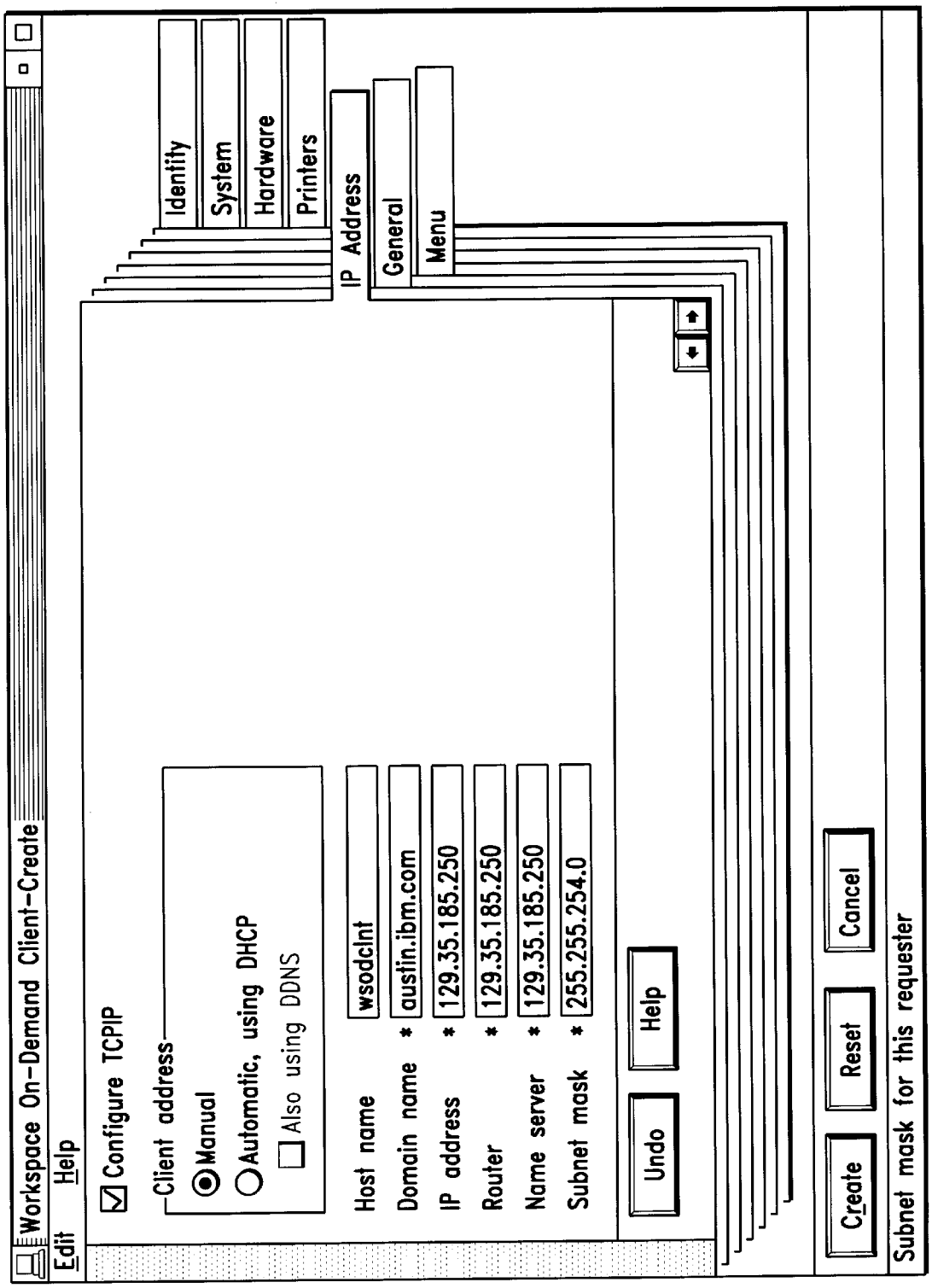
FIG. 16 is a screen shot of the IP address page of the client create notebook.

FIG. 16 is a screen shot of the IP address page of the client create notebook. In the preferred embodiment of the present invention, this page consists of radio buttons, check boxes and form menu bar fill lines. The IP address page offers both auto addressing and manual addressing. FIG. 16 shows manual entry client addressing, but automatic entry is another option. Other entry fields in the client machine creation code include the IP addresses for the machine, network, addresses etc.

Other pages not shown include a general setup information page and menu page, which contains a layout of the notebook. The menu page is similar to one found in the machine class create notebook.

After the pages in the client create notebook are completed with the client customizing information, the client information is stored in client database 850 with other clients' information. From client database 850, a user can select client information for the specific client rather that entering it anew.

Important considerations pertaining to the present invention are that typographical errors are completely eliminated, the selection process takes less time, and the user can visually see all possible options rather than having to rely on memory. Another important advantage is that the skill level of the operator need not be that of a programmer, but rather only that of one generally familiar with computers. A further advantage of the present invention is that, in the event the precise client configuration is not known, the user may try several machine configurations in an attempt to successfully boot the client machine.

The above-described examples are not meant to imply architectural limitations. While many of the depicted examples use RIPL protocol, a boot image could be created for remotely booting any computer configuration that utilizes any remote boot protocol. The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention and the practical application, to enable others of ordinary skill in the art to understand the invention for various embodiments with various modifications as are suited to the particular use contemplated.

What is claimed is:

1. A method of remotely configuring a computer system over a network, the method comprising:
   creating a database of operating system components for hardware elements;
   indexing the operating system components by specific hardware elements;
   storing the database of operating system components on a server;
   accessing the database of operating system components; and
   creating a machine class from the database of operating system components for a set of client machines that have at least one common hardware element.

2. The method as recited in claim 1, wherein the step of accessing the database of operating system components is performed by a system administrator.

3. The method as recited in claim 2, wherein the step of accessing the database of operating system components is performed by a program.

4. The method as recited in claim 1, wherein the step of accessing the database of operating system components is performed by a local user.

5. The method as recited in claim 1, wherein the step of accessing the database of operating system components is performed at the server.

6. The method as recited in claim 1, wherein the step of accessing the database of operating system components is performed at a client computer.

7. The method as recited in claim 1, wherein the step of creating a database of operating system components for hardware elements includes at least one of config.sys statements and windows registry elements.

8. The method as recited in claim 1, wherein the step of creating a database of operating system components for hardware elements further comprises:
   invoking database creation commands of at least one of administrator graphical user interface, command line interface, and application program interface.

9. The method as recited in claim 1, wherein the step of creating a machine class further comprises:
   invoking machine class creation commands by at least one of administrator graphical user interface, command line interface, and application program interface.

10. The method as recited in claim 1, wherein the step of creating a machine class is performed at runtime.

11. The method as recited in claim 1 further comprising:
    booting a client machine with the machine class created from the database of operating system components;
    modifying the machine class to form a machine instance of the client; and
    binding the machine instance of the client to the database of operating system components, wherein the binding of the modified machine instance is performed at runtime.

12. The method as recited in claim 1 further comprising:
    booting a client machine with a machine class created from the database of operating system components for the client machine, wherein the step of booting the client machine is performed remotely using a remote boot protocol.

13. The method as recited in claim 1 further comprising:
    installing the machine class created from the database of operating system components on a client machine; and
    booting the client machine with the machine class.

14. The method as recited in claim 1 further comprising:
    creating operating system components for hardware elements.

15. A data processing system for remotely configuring a computer system over a network, the data processing system comprising:
    creating means for creating a database of operating system components for hardware elements;
    indexing means for indexing the operating system components by specific hardware elements;
    storing means for storing the database of operating system components on a server;
    accessing means for accessing the database of operating system components; and
    creating means for creating a machine class from the database of operating system components for a set of client machines that have at least one common hardware element.

16. The data processing system as recited in claim 15, wherein the accessing means for accessing the database of operating system components is accessed by a system administrator.

17. The data processing system as recited in claim 16, wherein the accessing means for accessing the database of operating system components is accessed by a program.

18. The data processing system as recited in claim 15, wherein the accessing means for accessing the database of operating system components is accessed by a local user.

19. The data processing system as recited in claim 15, wherein the accessing means for accessing the database of operating system components is accessed at the server.

20. The data processing system as recited in claim 15, wherein the accessing means for accessing the database of operating system components is accessed at a client computer.

21. The data processing system recited in claim 15, wherein the creating means for creating a database of operating system components for hardware elements includes at least one of config.sys statements and windows registry elements.

22. The data processing system as recited in claim 15, wherein the creating means for creating a database of operating system components for hardware elements further comprises:

invoking means for invoking database creation commands of at least one of administrator graphical user interface, command line interface, and application program interface.

23. The data processing system as recited in claim 15, wherein the creating means for creating a machine class further comprises:

invoking means for invoking machine class creation commands by at least one of administrator graphical user interface, command line interface, and application program interface.

24. The data processing system as recited in claim 15, wherein the creating means for creating a machine class is performed at runtime.

25. The data processing system as recited in claim 15 further comprising:

booting means for booting a client machine with the machine class created from the database of operating system components;

modifying means for modifying the machine class to form a machine instance of the client; and binding means for binding the machine instance of the client to the database of operating system components, wherein the binding of the modified machine instance is performed at runtime.

26. The data processing system as recited in claim 15 further comprising:

booting means for booting a client machine with a machine class created from the database of operating system components for the client machine, wherein booting the client machine is performed remotely using a remote boot protocol.

27. The data processing system as recited in claim 15 further comprising:

installing means for installing the machine class created from the database of operating system components on a client machine; and booting means for booting the client machine with the machine class.

28. The data processing system as recited in claim 15 further comprising:

creating means for creating operating system components for hardware elements.

29. A computer program product for implementing a method for remotely configuring a computer system over a network, the method being embodied of a computer readable memory comprising instructions, the computer program product comprising:

instructions for creating a database of operating system components for hardware elements;

instructions for indexing the operating system components by specific hardware elements;

instructions for storing the database of operating system components on a server;

instructions for accessing the database of operating system components; and instructions for creating a machine class from the database of operating system components for a set of client machines that have at least one common hardware element.

* * * * *